(12) United States Patent
Charnock et al.

(10) Patent No.: US 6,828,353 B1
(45) Date of Patent: Dec. 7, 2004

(54) ION-EXCHANGE POLYMERS

(75) Inventors: Peter Charnock, Lancashire (GB);
David J. Kemmish, Lancashire (GB);
Philip A. Staniland, Cleveland (GB);
Brian Wilson, Lancashire (GB)

(73) Assignee: Victrex Manufacturing Limited, Lancashire (GB)

( * ) Notice: Subject to any disclaimer, the term of this patent is extended or adjusted under 35 U.S.C. 154(b) by 0 days.

(21) Appl. No.: 09/787,011
(22) PCT Filed: Sep. 10, 1999
(86) PCT No.: PCT/GB99/02833
§ 371 (c)(1), (2), (4) Date: Mar. 12, 2001
(87) PCT Pub. No.: WO00/15691
PCT Pub. Date: Mar. 23, 2000

(30) Foreign Application Priority Data

Sep. 11, 1998 (GB) .............................. 9819706
Sep. 28, 1998 (GB) .............................. 9820940
Jun. 11, 1999 (GB) .............................. 9913572

(51) Int. Cl.$^7$ .......................... C08J 5/22; H01M 4/00; H01M 8/00
(52) U.S. Cl. ...................... 521/27; 521/30; 429/33; 429/209; 429/314; 429/317; 525/328.5; 525/328.6; 525/344; 525/471; 525/534; 525/535; 528/125; 528/128; 528/171; 528/174; 528/212
(58) Field of Search ................. 521/27, 30; 525/328.5, 525/328.6, 344, 471, 534, 535; 429/209, 33; 528/171, 174, 125, 128, 212

(56) References Cited

U.S. PATENT DOCUMENTS

| 5,112,892 A | 5/1992 | Cardew |
| 5,271,813 A | 12/1993 | Linkous |
| 5,362,836 A | 11/1994 | Helmer-Metzmann et al. |
| 5,438,082 A | 8/1995 | Helmer-Metzmann et al. |
| 5,561,202 A | 10/1996 | Helmer-Metzmann et al. |
| 5,698,105 A | 12/1997 | Colquhoun et al. |
| 5,795,496 A | 8/1998 | Yen et al. |
| 5,837,783 A | 11/1998 | Arnold et al. |
| 5,847,032 A | 12/1998 | Arnold et al. |
| 5,985,477 A | 11/1999 | Iwasaki et al. |

FOREIGN PATENT DOCUMENTS

| EP | 0008895 | 3/1980 |
| EP | 0 029 633 | 6/1981 |
| EP | 0 041 780 | 12/1981 |
| EP | 0 182 506 | 5/1986 |
| EP | 0 202 850 | 11/1986 |
| EP | 0211693 | 2/1987 |
| EP | 0382440 | 8/1990 |
| EP | 0574791 | 12/1993 |
| EP | 0 575 807 | 12/1993 |
| EP | 0 688 824 | 12/1995 |
| EP | 0 731 820 | 9/1996 |
| EP | 0932213 | 7/1999 |
| FR | 2748485 | 11/1997 |
| GB | 2316802 | 3/1998 |
| JP | 10 21943 | 1/1989 |
| WO | 94/17905 | 8/1994 |
| WO | 96/29359 | 9/1996 |
| WO | 96/29360 | 9/1996 |
| WO | 97/19480 | 5/1997 |
| WO | 99/29763 | 6/1999 |

OTHER PUBLICATIONS

Wang et al; "Sodium sulfonate–functionalized poly(ether ether ketone)s"; Macromol. Chem. Phys. 199, pp. 1421–1426 (1998).
Wang et al; "Synthesis of poly(ether ether ketone) with high content of sodium sulfonate groups and its membrane characteristics"; Polymer 40 (1999); pp. 795–799.
Wang et al; "Synthesis of poly(ether ether ketone) containing sodium sulfonate groups as gas dehumidification membrane material"; Macromol. Rapid Commun. 19; pp 135–137 (1998).
Clark et al; "Trifluoromethylated poly(ether sulfone)s"; Polymer vol. 35 No. 11; pp. 2432–2437 (1994).
Lloyd et al and Wightman et al; "Poly(aryl ether) Membranes for Reverse Osmosis"; ACS Symposium Series 153, Synthetic Membranes: vol. 1, Desalination, pp. 326–349. (1981).
Bauer et al; "Electrochemical characterisation of sulfonated polyetherketone membranes"; Journal of New Materials for Electrochemical Systems, 3 pp. 93–98 (2000).
Shobha, et al; "Synthesis and Characterization of Sulfonated Poly(Arylene Ether)s Based on Functionalized Triphenyl Phosphine Oxide for Proton Exchange Membranes"; Polymer Preprints 2000, 41(1), pp. 180–181; and pp. 236–239.
Chunxiao et al; "The Microstructure of Polyetheretherketone Containing Biphenyl Linkages and the Properties of the Sulphonated Polymer"; Chemical Journal of Chinese Universities, vol. 15, No. 2, pp. 240–243 (1994) including English translation.
Ueda et al; "Synthesis and Characterization of Aromatic Poly (ether Sulfone)s Containing Pendant Sodium Sulfonate Groups"; Journal of Polymer Science, Part A: Polymer Chemistry, vol. 31, pp. 853–859 (1993).
AB J 09245818.

Primary Examiner—Fred Teskin
(74) Attorney, Agent, or Firm—Nixon & Vanderhye

(57) ABSTRACT

Ion-Exchange polymers for a polymer electrolyte membrane include a moiety of formula (I), and/or a moiety of formula (II), and/or a moiety of formula (III) wherein at least some of the units I, II and/or III are sulphonated. The phenyl moieties in units I, II, and III are independently optionally substituted and optionally cross-linked; m, r; s, t, v, w and z independently represent zero or a positive integer, E and E' independently represent an oxygen or a sulphur atom or a direct link, G represents an oxygen or sulphur atom, a direct link or a —O—Ph—O— moiety where Ph represents a phenyl group and Ar is selected from one of the moieties (i) to (x) as set forth herein which is bonded via one or more of its phenyl moieties to adjacent moieties.

38 Claims, 1 Drawing Sheet

ION-EXCHANGE POLYMERS

This invention relates to ion-exchange polymers and particularly, although not exclusively, relates to sulphonaced polymers, for example sulphonated polyaryletherketones, polyarylethersulphones and/or copolymers of the aforesaid. Preferred embodiments of the invention relate to ion-conductive membranes, for example of polymer electrolyte membrane fuel cells, made using such polymers. The invention also relates to novel, non-sulphonated polyaryletherketones and/or polyarylethersulphones used for preparing said sulphonated polymers and processes for the preparation of polymers described herein.

BACKGROUND OF THE INVENTION

A polymer electrolyte membrane fuel cell (PEMFC), shown schematically in FIG. 1 of the accompanying diagrammatic drawings, may comprise a thin sheet 2 of a hydrogen-ion conducting Polymer Electrolyte Membrane (PEM) sandwiched on both sides by a layer 4 of platinum catalyst and an electrode 6. The layers 2, 4, 6 make up a Membrane Electrode Assembly (MEA) of less than 1 mm thickness.

In a PEMFC, hydrogen is introduced at the anode (fuel electrode) which results in the following electrochemical reaction:

Pt-Anode (Fuel Electrode) $2H_2 \rightarrow 4H^+ + 4e$

The hydrogen ions migrate through the conducting PEM to the cathode. Simultaneously, an oxidant is introduced at the cathode (oxidant electrode) where the following electrochemical reaction takes place:

Pt-Cathode (Oxidant Electrode) $O_2 + 4H^+ + 4e \rightarrow 2H_2O$

Thus, electrons and protons are consumed to produce water and heat. Connecting the two electrodes through an external circuit causes an electrical current to flow in the circuit and withdraw electrical power from the cell.

U.S. Pat. No. 5,561,202 (Hoechst) discloses the production of PEMs from sulphonated aromatic polyether ketones. At least 5% of the sulphonic groups in the sulphonic acid moieties are converted into sulphonyl chloride groups and then reacted with an amine containing at least one cross-linkable substituent or a further functional group. An aromatic sulphonamide is, then isolated, dissolved in an organic solvent, converted into a film and then the cross-linkable substituents in the film are cross-linked. The invention is said to provide ion-conductive membranes suitable for use as polymeric solid electrolytes which have adequate chemical stability and can be produced from polymers which are soluble in suitable solvents.

One problem associated with known PEMFCs is that of providing PEMs which have desirable properties at elevated temperatures and which are cheap to manufacture.

SUMMARY OF THE INVENTION

It is an object of the present invention to address problems associated with PEMs.

According to a first aspect of the invention, there is provided a polymer electrolyte membrane which includes a polymer having a moiety of formula

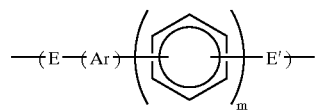

I and/or a moiety of formula

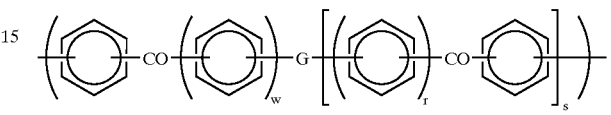

II and/or a moiety of formula

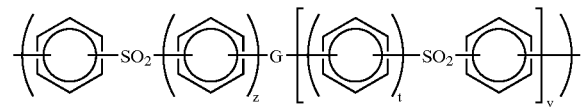

III wherein at least some of the units I, II and/or III are sulphonated; wherein the phenyl moieties in units I, II, and III are independently optionally substituted and optionally cross-linked; and wherein m,r,s,t,v,w and z independently represent zero or a positive integer, E and E' independently represent an oxygen or a sulphur atom or a direct link, G represents an oxygen or sulphur atom, a direct link or a —O—Ph—O— moiety where Ph represents a phenyl group and Ar is selected from one of the following moieties (i) to (x) which is bonded via one or more of its phenyl moieties to adjacent moieties

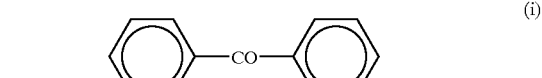

(i)

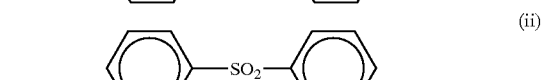

(ii)

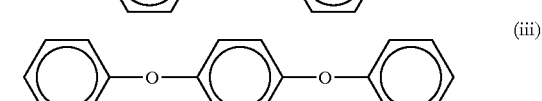

(iii)

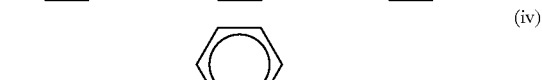

(iv)

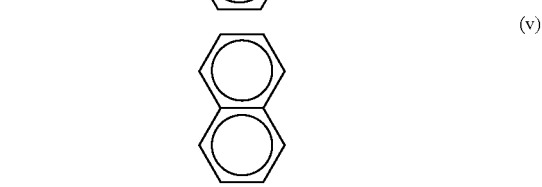

(v)

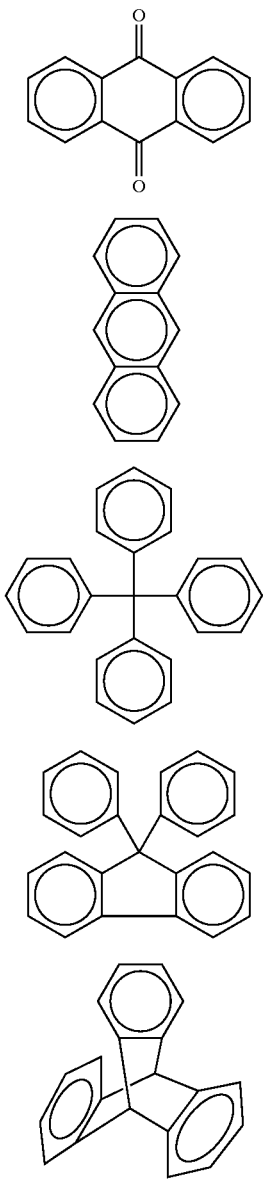

The invention extends to a polymer electrolyte membrane which includes a polymer having a moiety of formula I and/or a moiety of formula II and/or a moiety of formula III as described according to said first aspect, wherein at least some of units I, II and/or III are functionalised to provide ion exchange sites. Suitably, to provide said ion exchange sites, said polymer is sulphonated, phosphorylated, carboxylated, quaternary-aminoalkylated or chloromethylated, and optionally further modified to yield —$CH_2PO_3H_2$, —$CH_2NR_3^{20+}$ where $R^{20}$ is an alkyl, or —$CH_2NAr_3^{x+}$ where $Ar^x$ is an aromatic (arene), to provide a cation or: anion exchange membrane. Further still, the aromatic moiety may contain a hydroxyl group which can be readily elaborated by existing methods to generate —$OSO_3H$ and —$OPO_3H_2$ cationic exchange sites on the polymer. Ion exchange sites of the type stated may be provided as described in WO95/08581.

References to sulphonation include a reference to substitution with a group —$SO_3M$ wherein M stands for one or more elements selected with due consideration to ionic valencies from the following group: H, $NR_4^{y+}$, in which $R^y$ stands for H, $C_1$–C4 alkyl, or an alkali or alkaline earth metal or a metal of sub-group 8, preferably H, $NR_4^{y+}$, Na, K, Ca, Mg, Fe, and Pt. Preferably M represents H. Sulphonation of the type stated may be provided as described in WO96/29360.

Unless otherwise stated in this specification, a phenyl moiety may have 1,4- or 1,3-, especially 1,4-, linkages to moieties to which it is bonded.

Said polymer may include more than one different type of repeat unit of formula I; more than one different type of repeat unit of formula II; and more than one different type of repeat unit of formula III.

Said moieties I, II and III are suitably repeat units. In the polymer, units I, II and/or III are suitably bonded to one another—that is, with no other atoms or groups being bonded between units I, II, and III.

Where the phenyl moieties in units I, II or III are optionally substituted, they may be optionally substituted by one or more halogen, especially fluorine and chlorine, atoms or alkyl, cycloalkyl or phenyl groups. Preferred alkyl groups are $C_{1-10}$, especially $C_{1-4}$, alkyl groups. Preferred cycloalkyl groups include cyclohexyl and multicyclic groups, for example adamantyl. In some cases, the optional substituents may be used in the cross-linking of the polymer. For example, hydrocarbon optional substituents may be functionalised, for example sulphonated, to allow a cross-linking reaction to take place. Preferably, said phenyl moieties are unsubstituted.

Another group of optional substituents of the phenyl moieties in units I, II or III include alkyls, halogens, $C_yF_{2y+1}$, where y is an integer greater than zero, O—$R^q$ (where $R^q$ is selected from the group consisting of alkyls, perfluoralkyls and aryls), $CF=CF_2$, CN, $NO_2$ and OH. Trifluormethylated phenyl moieties may be preferred in some circumstances.

Where said polymer is cross-linked, it is suitably cross-linked so as to improve its properties as a polymer electrolyte membrane, for example to reduce its swellability in water. Any suitable means may be used to effect cross-linking. For example, where E represents a sulphur atom, cross-linking between polymer chains may be effected via sulphur atoms on respective chains. Alternatively said polymer may be cross-linked via sulphonamide bridges as described in U.S. Pat. No. 5,561,202. A further alternative is to effect cross-linking as described in EP-A-0008895.

However, for polymers according to the first aspect or second aspect which are crystalline (which some are) there may be no need to effect cross-linking to produce a material which can be used as a polymer electrolyte membrane. Such polymers may be easier to prepare: than cross-linked polymers. Thus, said polymer of the first and/or second aspects may be crystalline. Preferably, said polymer is not optionally cross-linked as described.

Where w and/or z is/are greater than zero, the respective phenylene moieties may independently have; 1,4- or 1,3- linkages to the other moieties in the repeat units of formulae II and/or III. Preferably, said phenylene moieties have 1,4- linkages.

Preferably, the polymeric chain of the polymer does not include a —S— moiety. Preferably, G represents a direct link.

Suitably, "a" represents the mole % of units of formula I in said polymer, suitably wherein each unit I is the same; "b" represents the mole % of units of formula II in said polymer, suitably wherein each unit II is the same; and "c" I represents the mole % of units of formula III in said polymer, suitably wherein each unit III is the same. Preferably, a is in the range 45–100, more preferably in the range 45–55, especially in the range 48–52. Preferably, the sum of b and c is in the range 0–55, more preferably in the range 45–55, especially in the range 48–52. Preferably, the ratio of a to the sum of b and c is in the range 0.9 to 1.1 and, more preferably, is about 1. Suitably, the sum of a, b and c is at least 90, preferably at least 95, more preferably at least 99, especially about 100. Preferably, said polymer consists essentially: of moieties I, II and/or III.

Said polymer may be a homopolymer having a repeat unit of general formula

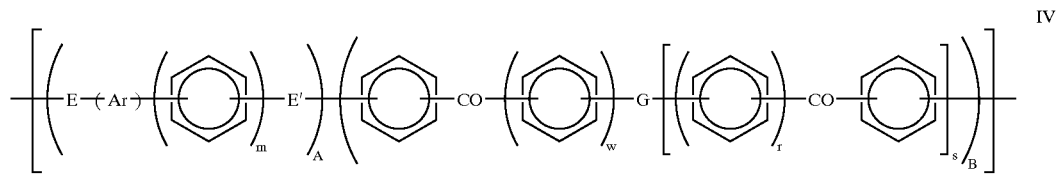

or a homopolymer having a repeat unit of general formula.

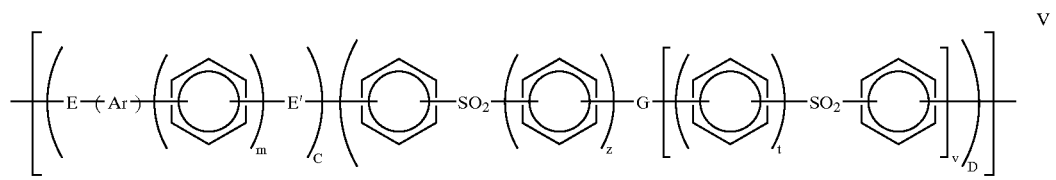

or a random or block copolymer of at least two different units of IV and/or V
wherein A, B. C and D independently represent 0 or 1 and E,E', G,Ar,m,r,s,t,v,w and z are as described in any statement herein.

As an alternative to a polymer comprising units IV and/or V discussed above, said polymer may be a homopolymer having a repeat unit of general formula

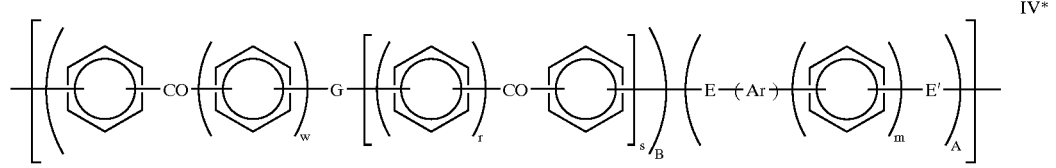

or a homopolymer having a repeat unit of general formula

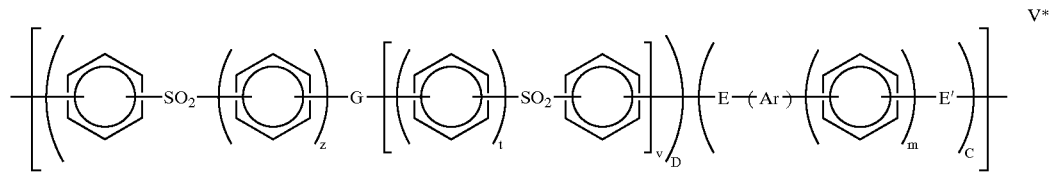

or a random or block copolymer of at least two different units of IV* and/or V*, wherein A, B, C, and D independently represent 0 or 1 and E, E', G, Ar, m, r, s, t, v, w and z are as described in any statement herein.

Preferably, m is in the range 0–3, more preferably 0–12, especially 0–1. Preferably, r is in the range 0–3, more preferably 0–2, especially 0–1. Preferably t is in the range 0–3, more preferably 0–2, especially 0–1. Preferably, s is 0 or 1. Preferably v is 0 or 1. Preferably, w is 0 or 1. Preferably z is 0 or 1.

Preferably Ar is selected from the following moieties (xi) to (xxi):

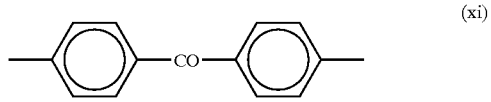

-continued

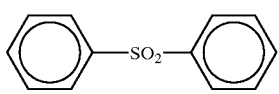

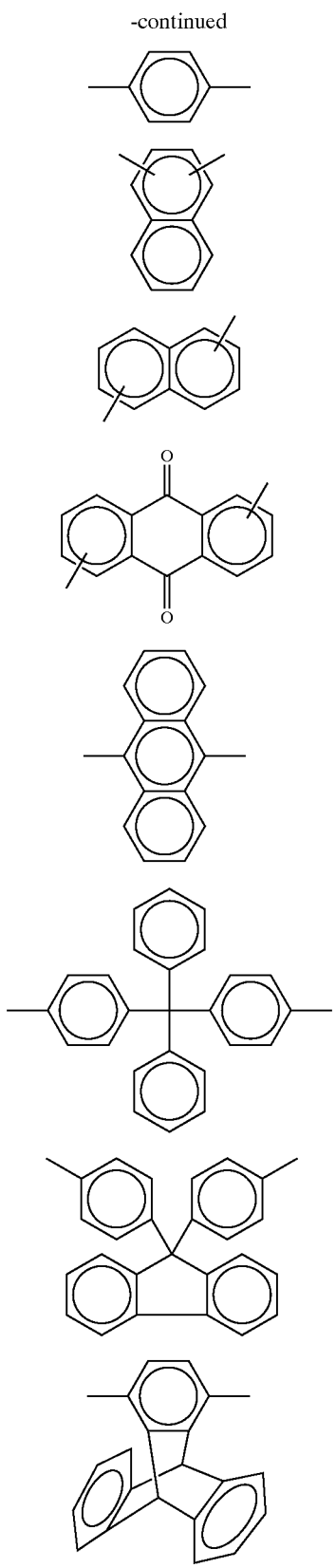

Preferably, (xv) is selected from a 0.1,2-, 1,3-, or a 1,5-moiety; (xvi) is selected from a 1,6-, 2,3-, 2,6- or a 2,7-moiety; and (xvii) is selected from a 1,2-, 1,4-, 1,5-, 1,8- or a 2,6- moiety.

One preferred class of polymers may include at least some ketone moieties in the polymeric chain. In such a preferred class, the polymer preferably does not! only include —O— and —SO$_2$— moieties between aryl (or other unsaturated) moieties in the polymeric chain. Thus, in this case, suitably, a polymer of the first and/or second aspects does not consist only of moieties of formula; III, but also includes moieties of formula I and/or II.

One preferred class of polymers does not include any moieties of formula III, but suitably only includes moieties of formulae I and/or II. Where said polymer is a homopolymer or random or block copolymer as described, said homopolymer or copolymer suitably includes a repeat unit of general formula IV. Such a polymer may, in some embodiments, not include any repeat unit of general formula V.

Referring to formula IV, preferably, said polymer is not a polymer wherein: Ar represents moiety (iv), E and E' represent oxygen atoms, m represents zero, w represents 1, s represents zero, and A and B represent 1; Ar represents moiety (i), E and E' represent oxygen atoms, G represents a direct link, m represents zero, w represents 1, r represents O, s represents 1 and A and B represent 1; A Ar represents moiety (iv), E and E' represent oxygen atoms, G represents a direct link, m represents O, w represents O, s represents 1, r represents 1 and A and B represents 1. Referring to formula V, preferably Ar represents moiety (iv), E and E' represent oxygen atoms, G represents a direct link, m represents zero, z represents 1, v represents zero and C and D represent 1.

Preferably, said polymer is not a sulphonated aromatic polyecherketone of formula

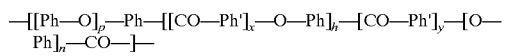

where Ph represents a 1,4- or 1,3-phenylene moiety; Ph' represents phenylene, naphthylene, biphenylene or anthrylene; p is 1, 2, 3 or 4; x, h and n are, independently, zero or 1; and y is 1, 2 or 3.

Preferably, said polymer does not conform to the formula

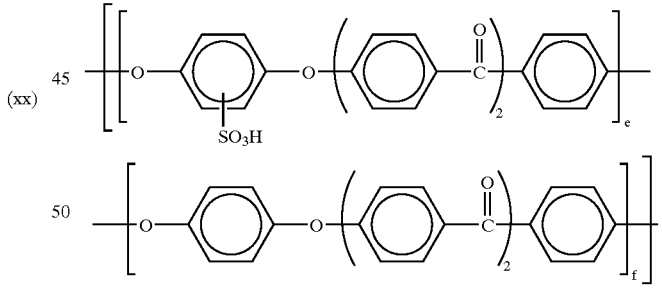

where
e is from 0.2 to 1,
f is from 0 to 0.8, and
e+f=1

Preferably, said polymer does not conform to the formula

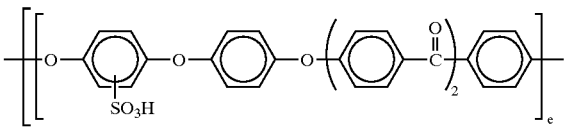

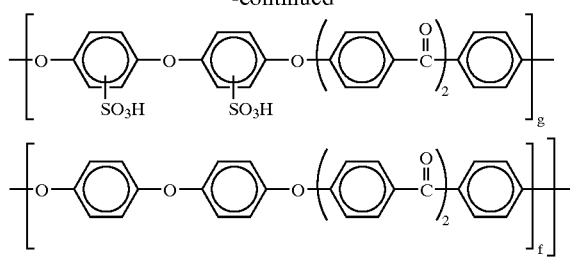

in which e is a number from 0 to 1, g is a number from 0 to 1, f is a number from 0 to 0.5, and the sum e+f+g=1.

Preferably, said polymer is not a copolymer built up from at least two different units of formulae:

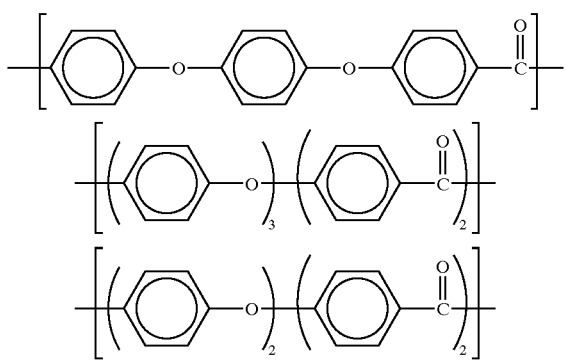

Suitable moieties Ar are moieties (i), (ii) (iv) and (v) and, of these, moieties (i), (ii) and (iv) are preferred. Preferred moieties Ar are moieties (xi), (xii), (xiv), (xv) and (xvi) and, of these, moieties (xi), (xii) and (xiv) are especially preferred. Another preferred moiety is moiety (v), especially, moiety (xvi). In relation, in particular to the alternative polymers comprising units IV* and/or V*, preferred Ar moieties are (v) and, especially, (xvi).

Preferred polymers include an electron-rich, relatively non-deactivated, easily sulphonatable unit, for example a multi-phenylene moiety or a fused-rings aromatic moiety, such as naphthalene. Such an easy to sulphonate unit may be sulphonated under relatively mild conditions to introduce two sulphonate groups per unit. Thus, preferred polymers may have at least $10_n$ electrons in a delocalized aromatic moiety. The number of 90 electrons may be 12 or less. Preferred polymers include a biphenylene moiety. Other preferred polymers include a naphthalene moiety. Preferred polymers include said electron rich, non-deactivated, easily sulphonatable unit bonded to two oxygen atoms. Especially preferred polymers include a —O-biphenyllene-O— moiety. especially preferred polymers include a —O-naohthalene-O— moiety.

Preferred polymers include a first type of moiety which is relatively difficult to sulphonate and a second type of moiety which is relatively easy to sulphonate. For example, said second moiety may be sulphonatable using the relatively mild method described in Example 13 hereinafter, whereas the first moiety may be substantially non-sulphonatable in such a method. The use of the method of Example 13 may be advantageous over currently used methods which use oleum. A preferred second said moiety includes a imoiety —$Ph_n$— wherein n is an integer of at least 2. Said moiety is preferably bound to at least one ether oxygen. Especially preferred is the case wherein said moiety is —O—$Ph_n$—O— where said ether groups are para to the Ph—Ph bond.

Preferred polymers are copolymers comprising a first repeat unit which is selected from the following:

(a) a unit of formula IV wherein E and E' represent oxygen atoms, G represents a direct link, Ar represents a moiety of structure (iv), m and s represent zero, w represents 1 and A and B represent 1;

(b) a unit of formula IV wherein E represents an oxygen tom, E' represents a direct link, Ar represents a moiety of structure (i), m represents zero, A represents 1, B represents zero;

(c) a unit of formula V wherein E and E' represent oxygen atoms, G represents a direct link, Ar represents a moiety of structure (iv), m and v represent zero, z represents 1 and C and D represent 1;

(d) a unit of formula V wherein E represents an oxygen atom, E' represents a direct link, Ar represents a moiety of structure (ii), m represents 0, C represents 1, D represents 0; or (e) a unit of formula V wherein E and E' represents an oxygen atom, Ar represents a structure (i), m represents 0, C represents 1, Z represents 1, G represents a direct link, v represents 0 and D represents 1;

and a second repeat unit which is selected from the following:

(f) a unit of formula IV wherein E and E' represent oxygen atoms, G represents a direct link, Ar represents a moiety of structure (iv), m represents 1, w represents 1, s represents zero, A and B represent 1;

(g) a unit of formula IV wherein E represents an oxygen atom, E' is a direct link, G represents a direct link, Ar represents a moiety of structure (iv), m and s represent zero, w represent 1, A and B represent 1;

(h) a unit of formula V wherein E and E' represent oxygen atoms, G represents a direct link, Ar represents a moiety of structure (iv), m represents 1, z represents 1, v represents 0, C and D represent 1; and (i) a unit of formula V wherein E represents an oxygen atom, E' represents a direct link, G represents a direct link, Ar represents a moiety of structure (iv), mland v represent zero, z represents 1, C and D represent 1;

Other second units which may form copolymers with any of said first repeat units (a) to (e) above include: a unit of formula IV wherein E and E' represent oxygen atoms, G represents a direct link, Ar represents a moiety of structure (v), m represents 0, w represents 1, s represents 0, A and B represent 1; or a unit of formula V wherein E and E' represent oxygen atoms, G represents a direct link, Ar represents a moiety of structure (v), m represents: 0, z represents 1, v represents 0, C and: D represent 1.

Preferred polymers for some situations may comprise first units selected from (a), (b), (c) and (e) and second units selected from (f), (g), (h) or (i). A polymer. comprising units (d) and (h) may also be preferred.

More preferred polymers are copolymers having a first repeat unit selected from those described above, especially repeat units (b), (d) or (e) in combination with a second repeat unit selected from units (f) or (h).

Preferred polymers having repeat unit(s) of formulae IV* and V* may include: a unit of formula IV* wherein Ar represents a moiety of structure (v), E represents a direct link, E' represents an oxygen atom, G represents a direct link, w, s and m represent 0, A and B represent 1; and/or a repeat unit of formula. V* wherein Ar represents a moiety of structure (v), E represents a direct link, E' represents an oxygen atom, G represents a direct link, z, v and m represent 0, C and D represent 1.

Said polymers having repeat units IV* and V* may include any of repeat units (a) to (i) described above.

In some situations, polymers which include at least one repeat unit of formula IV or formula IV* may be preferred.

Copolymers may be prepared having one or more first repeat units and one or more of said second repeat units.

Where said polymer is a copolymer as described, the mole % of co-monomer units, for example said first and second repeat units described above, may be varied to vary the solubility of the polymer in solvents, for example in organic solvents which may be used in the preparation of films and/or membranes from the polymers and/or in other solvents, especially water.

Preferred polymers suitably have a solubility of at least 10% w/v, preferably a solubility in the range 10 to 30% w/v in a polar aprotic solvent, for example NMP, DMSO or DMF. Preferred polymers are substantially insoluble in boiling water.

First units of the type described above (with, the exception of units (a) and (c)) may be relatively difficult to sulphonate, whereas second units of the type described may be easier to sulphonate.

Where a phenyl moiety is sulphonated, it may only be mono-sulphonated. However, in some situations it may be possible to effect bi- or multi-sulphonation.

In general terms, where a said polymer includes a —O-phenyl-O— moiety, up to 100 mole % of the phenyl moieties may be sulphonated. Where a said polymer includes a —O-biphenylene-O— moiety, up to 100 mole % of the phenyl moieties may be sulphonated. It is believed to be possible to sulphonate relatively easily —O-(phenyl)$_n$—O— moieties wherein n is an integer, suitably 1–3, at up to 100 mole %. Moieties of formula —O-(phenyl)$_n$—CO— or —O-(phenyl)$_n$—SO$_2$— may also be sulphonated at up to 100 mole % but more vigorous conditions may be required. Moieties of formulae —CO-(phenyl)$_n$—CO— and —SO$_2$-(phenyl)$_n$—SO$_2$— are more difficult to sulphonate and may be sulphonated to a level less than 100 mole % or not at all under some sulphonation conditions.

The glass transition temperature ($T_g$) of said polymer may be at least 144° C., suitably at least 150° C., preferably at least 154° C., more preferably at least 160° C., especially at least 164° C. In some cases, the Tg may be at least 170° C., or at least 190° C. or greater than 250° C. or even 300° C.

Said polymer may have an inherent viscosity (IV) of at least 0.1, suitably at least 0.3, preferably at least 0.4, more preferably at least 0.6, especially at least 0.7 (which corresponds to a reduced viscosity (RV) of least 0.8) wherein RV is measured at 25° C. on a solution of the polymer in concentrated sulphuric acid of density 1.84 gcm$^{-3}$, said solution containing 1 g of polymer per 100 cm$^{-3}$ of solution. IV is measured at 25° C. on a solution of polymer in concentrated sulphuric acid of density 1.84 gcm$^3$, said solution containing 0.1 g of polymer per 100 cm$^3$ of solution.

The measurements of both RV and IV both suitably employ a viscometer having a solvent flow time of approximately 2 minutes.

The main peak of the melting endotherm (Tm) for said polymer (if crystalline) may be at least 300° C.

In general terms, said polymer is preferably substantially stable when used as a PEM in a fuel cell. Thus, it suitably has high resistance to oxidation, reduction and hydrolysis and has very low permeability to reactants in the fuel cell. Preferably, however, it has a high proton conductivity. Furthermore, it suitably has high mechanical strength and is capable of being bonded to other components which make up a membrane electrode assembly.

Said polymer may comprise a film, suitably having a thickness of less than 1 mm, preferably less than 0.5 mm, more preferably less than 0.1 mm, especially less than 0.05 mm. The film may have a thickness of at least 5μm.

Said polymer electrolyte membrane may comprise one or more layers wherein, suitably, at least one layer comprises a film of said polymer. Said membrane may have a thickness of at least 5μm and, suitably, less than 1 mm, preferably less than 0.5 mm, more preferably less than 0.1 mm, especially less than 0.05 mm.

The polymer electrolyte membrane may be a composite membrane which suitably includes a support material for the conductive polymer for imparting mechanical strength and dimensional stability to the membrane. The polymer may be associated with the support material to form a composite membrane in a variety of ways. For example, an unsupported conductive polymer film can be preformed and laminated to the support material. Alternatively, (and preferably) the support material may be porous and a solution of the conductive polymer can be impregnated into the support material. In one embodiment, the support material may comprise, or preferably consist essentially of, polytetrafluoroethylene, suitably provided as a porous film. Such a support material may be as described and used in accordance with the teachings of WO97/25369 and WO96/28242, the contents of which are incorporated herein by reference. Suitably, the support material has a porous microstructure of polymeric fibrils and is impregnated with said polymer throughout the material, preferably so as to render an interior volume of the membrane substantially occlusive.

The use of support material as described may allow polymers of lower equivalent weights (EW) (for example less than 500 g/mol, less than 450 g/mol or even less than 400 g/mol or 370 g/mol) or relatively inflexible and/or brittle polymers to be used in polymer electrolyte membranes.

The polymer electrolyte membrane suitably includes a layer of a catalyst material, which may be a platinum catalyst (i.e. platinum containing) or a mixture of platinum and ruthenium, on both sides of the polymer film. Electrodes may be provided outside the catalyst material.

It may be preferable for each phenyl group in a sulphonated polymer as described to be deactivated by being bonded directly to an electron withdrawing group, for example a sulphonated group, a sulphone group or a ketone group.

According to a second aspect of the invention, there is provided a polymer electrolyte membrane which includes a polymer which includes: polyaryletherketone and/or polyarylethersulphone units; and units of formula —OPh$_n$—O— (XX) wherein Ph represents a phenyl group and n represents an integer of 2 or greater and wherein Ph groups of units (XX) are sulphonated.

Preferably, each phenyl group of moiety Ph$_n$ is sulphonated, preferably mono-sulphonated. About 100 mole % of such phenyl groups may be sulphonated as described.

Preferably, —OPhCO— and/or —OPhSO$_2$— moieties of said polymer are sulphonated to a lesser extent than the phenyl groups of moiety Ph$_n$. Moieties —OPhCO— and —OPhSO$_2$— may be substantially non-sulphonated.

In one embodiment, said polymer may include no ketone linkages and may have an equivalent weight of more than 900. Nonetheless, it has been found, surprisingly, that such polymers are still conducting.

Said polymer electrolyte membrane may be for a fuel cell or an electrolyser.

The invention extends to the use of a polymer which includes relatively easy to sulphonate units and relatively difficult to sulphonace units in the preparation of a polymer for a polymer electrolyte membrane.

The polymer electrolyte membrane described herein may include a blend of polymers, at least one of which is a polymer described according to the invention described herein. Suitably the polymers described herein are blended with 0–40wt %, preferably 0–20wt %, more preferably 0–10wt %, especially 0—5wt % of other polymeric material. Preferably, however, a blend of polymers is not provided.

According to a third aspect of the invention, there is provided a fuel cell or an electrolyser (especially a fuel cell) incorporating a polymer electrolyte membrane according to the first or second aspects.

According to a fourth aspect of the invention, there is provided any novel polymer as described according to said first aspect per se.

According to a fifth aspect of the invention, there is provided a process for the preparation of a polymer as described in the first, second, third and/or fourth aspects, the process comprising:

(a) polycondensing a compound of general formula

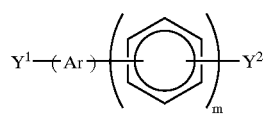

VI with itself wherein $Y^1$ represents a halogen atom or a group —EH and $y^2$ represents a halogen atom or, if $y^1$ represents a halogen atom, $Y^2$ represents a group E'H; or (b) polycondensing a compound of general formula

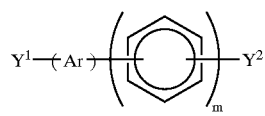

VI with a compound of formula

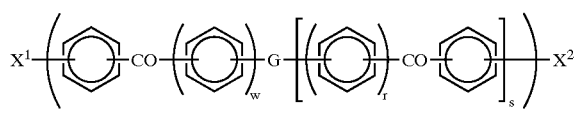

VII and/or with a compound of formula

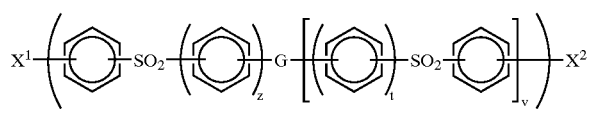

VIII wherein $Y^1$ represents a halogen atom or a group —EH (or E' H if appropriate) and $X^1$ represents the other one of a halogen atom or group —EH (or —E'H if appropriate) and $Y^2$ represents a halogen atom or a group —E' H and $X^2$ represents the other one of a halogen atom or a group —E' H (or —EH if appropriate).

(c) optionally copolymerizing a product of a process as described in paragraph (a) with a product of a process as described in paragraph (b);

wherein the phenyl moieties of units VI, VII and/or VIII are optionally substituted; the compounds VI, VII and/or VIII are optionally sulphonated; and Ar, m, w, r, s, z, t, v, G, E and E' are as described above except that E and E' do not represent a direct link;

the process also optionally comprising sulphonating and/or cross-linking a product of the reaction described in paragraphs (a), (b) and/or (c) to prepare said polymer.

In some situations, the polymer prepared, more particularly phenyl groups thereof, may be optionally substituted with the groups hereinabove described after polymer formation.

Preferably, where $Y^1$, $Y^2$, $X^1$ and/or $X^2$ represent a halogen, especially a fluorine, atom, an activating group, especially a carbonyl or sulphone group, is arranged ortho- or para- to the halogen atom.

Advantageously, where it is desired to prepare a copolymer comprising a first repeat unit IV or V wherein E represent an oxygen or sulphur atom, Ar represents a moiety of structure (i), m represents zero, E' represents a direct link, A represents 1 and B represents zero and a second repeat unit IV or V wherein E and E' represent an oxygen or sulphur atom, Ar represents a moiety of structure (iv), m and w represent 1, G represents a direct link, s represents zero and A and B represent 1 wherein the polymer is not a random polymer but has a regular structure, the process described in paragraph (b) above may be used wherein in said compound of general formula VI, $Y^1$ and y2 represent —OH or —SH groups, Ar represents a moiety of structure (iv) and m represents 1 and in said compounds of general formulae VII and VIII, $X^1$ and $X^2$ represent a fluorine atom, w,r,s,z,t and v represent 1 and G represents an oxygen or sulphur atom.

In another embodiment, where it is desired to prepare a copolymer comprising a first repeat unit IV or V wherein E and E' represent an oxygen or sulphur atom, Ar represents a moiety of structure (iv), m represents zero, A represents 1, w represents 1, s represents zero and B represents: 1 and a second repeat unit IV or V wherein E and E' represent an oxygen or sulphur atom, Ar represents a moiety of structure (iv), m and w represent 1, s represents zero and A and B represent 1, wherein the polymer is not a random polymer but has a regular structure, the process described in paragraph (b) above may be used wherein in said compound of general formula VI, $Y^1$ and $Y^2$ represent —OH or —SH groups, Ar represents a moiety of structure (iv) and m represents 1 and in said compounds of general formulae VII and VIII, $X^1$ and $X^2$ represent a fluorine atom, w,r,s,z,t and v represent 1 and G represents a —O—Ph—O— moiety.

Preferred halogen atoms are fluorine and chlorine atoms, with fluorine atoms being especially preferred. Preferably, halogen atoms are arranged meta- or para- to activating groups, especially carbonyl groups.

Where the process described in paragraph (a) is carried out, preferably one of $Y^1$ and $Y^2$ represents a fluorine atom and the other represents an hydroxy group. More preferably in this case, $Y^1$ represents a fluorine atom and $Y^2$ represents an hydroxy group. Advantageously; the process described in paragraph (a) may be used when Ar represents a moiety of structure (i) and m represents 1.

When a process described in paragraph (b) is carried out, preferably, $Y^1$ and $Y^2$ each represent an hydroxy group.

Preferably, $X^1$ and $X^2$ each represent a halogen atom, suitably the same halogen atom.

Compounds of general formula VI, VII and VIII are commercially available (eg from Aldrich U.K.) and/or may be prepared by standard techniques, generally involving is Friedel-Crafts reactions, followed by appropriate derivatisation of functional groups. The preparations of some of the monomers described herein are described in P M Hergenrother, B J Jensen and S J Havens, Polymer 29, 358 (1998), H R Kricheldorf and U Delius, Macromolecules 22, 517 (1989) and P A Staniland, Bull, Soc, Chem, Belg., 98 (9–10), 667 (1989)

Where compounds VI, VII and/or VIII are sulphonated, compounds of formulas VI, VII and/or VIII which arel not sulphonated may be prepared and such compounds may be sulphonated prior to said polycondensation reaction.

Sulphonation as described herein may be carried oust in concentrated sulphuric acid (suitably at least 96% w/w, preferably at least 97% w/w, more preferably at least 98% w/w; and preferably less than 98.5% w/w) at an elevated temperature. For example, dried polymer may be contacted with sulphuric acid and heated with stirring at a temperature of greater than 40° C., preferably greater than 55° C., for at least one hour, preferably at least two hours, more preferably about three hours. The desired product may be caused to precipitate, suitably by contact with cooled water, and isolated by standard techniques. Sulphonation may also be effected as described in U.S. Pat. No. 5,362,836 and/or EP0041780.

Where the process described in paragraph (b) is carried out, suitably, "a*" represents the mole % of compound VI used in the process; "b*" represents the mole % of compound VII used in the process; and "c*" represents the mole % of compound VIII used in the process.

Preferably, a* is in the range 45–55, especially in the. range 48–52. Preferably, the sum of b* and c* is in the range 45–55, especially in the range 48–52. Preferably, the sum of a*, b* and c* is 100.

Where the process described in paragraph (b) is carried out, preferably, one of either the total mole % of halogen atoms or groups —EH/—E'H in compounds VI, VII and VIII is greater, for example by up to 10%, especially up to 5%, than the total mole % of the other one of either the total mole % of halogen atoms or groups —EH/—E'H in compounds VI, VII and VIII. Where the mole % of halogen atoms is greater, the polymer may have halogen end groups and be more stable than when the mole % of groups —EH/—E'H is greater in which case the polymer will have —EH/—E'H end groups. However, polymers having —EH/—E'H end groups may be advantageously cross-linked.

The molecular weight of the polymer can also be controlled by using an excess of halogen or hydroxy reactants. The excess may typically be in the range 0.1 to 5.0 mole %. The polymerisation reaction may be terminated by addition of one or more monofunctional reactants as end-cappers.

It is believed that certain polymers described herein are novel and, therefore, in a sixth aspect, the invention extends to any novel polymer described herein per se.

It is also believed that certain polymers according to said first and/or second aspect but which are; not sulphonated are novel. Thus, according to a seventh aspect of the invention, there is provided a novel polymer having a moiety of formula I and/or a moiety of formula II and/or a moiety of formula III wherein ,E,E', G,m,r,s,t,v,w,z and Ar are as described in any statement herein.

Preferably, said polymer includes a moiety of formula II and/or III and Ar is selected from

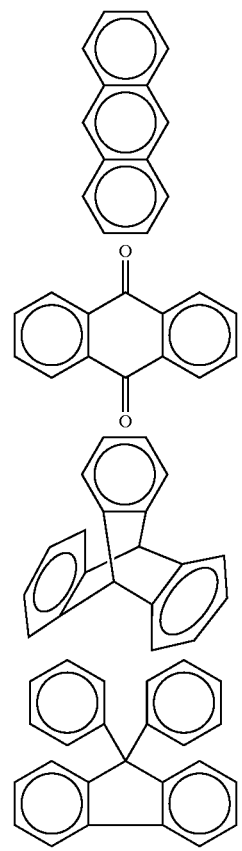

Preferably, in the aforementioned formulae, each —Ar— is bonded to adjacent moieties as described in any statement herein.

According co an eighth aspect of the invention, there is provided a process for the preparation of novel polymers according to said seventh aspect, the process being as described according to the process of the fifth aspect except that compounds VI, VII and VIII are not sulphonated and the process does not include a sulphonation step.

Sulphonated polymers described herein may be made into films and/or membranes for use as PEMs by conventional techniques, for example as described in Examples 5 to, 7 of U.S. Pat. No. 5,561,202.

The sulphonated polymers described herein may be used as polymer electrolyte membranes in fuel cells or electrolysers as described. Additionally, they may be used in gas diffusion electrodes.

Any feature of any aspect of any invention or example described herein may be combined with any feature of any aspect of any other invention or example described herein.

BRIEF DESCRIPTION OF THE DRAWINGS

Specific embodiments of the invention will now be described, by way of example, with reference to FIG. 1 which is a schematic representation of a polymer electrolyte membrane fuel cell.

As described above, the fuel cell includes a thin sheet 2 of a hydrogen-ion conducting Polymer Electrolyte Membrane. The preparation of sheet material for such a membrane is described hereinafter.

EXAMPLES

Example 1

Figure 1:
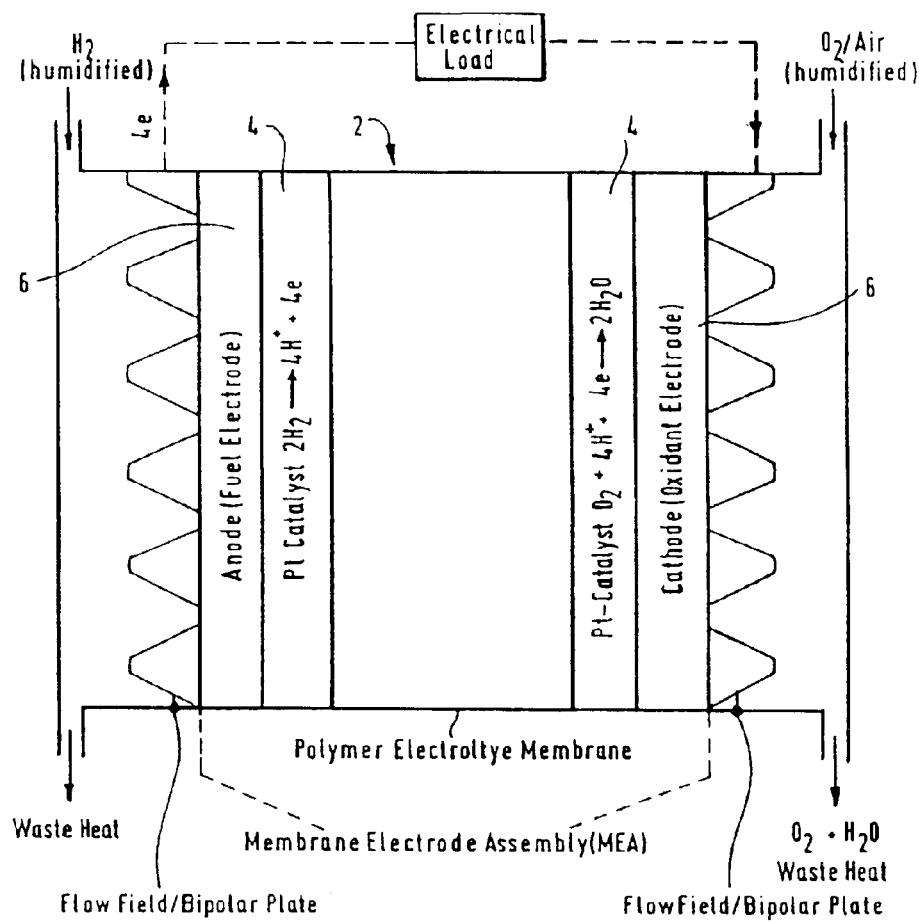

A 700 ml flanged flask fitted with a ground glass Quickfit lid, stirrer/stirrer guide, nitrogen inlet and outlet was charged with 4,4'-difluorobenzophenone (891.03 g, 0.408 mole), 4,41'-dihydroxybenzophenone (34.28 g, 0.16 mole), 4,4'-dihydroxybiphenyl(44.69 g, 0.24 mole): and diphenysulphone (332 g) and purged with nitrogen for at least 1 hour. The contents were then heated under a nitrogen blanket to between 140 and 145° C. to form an almost colourless solution. While maintaining a nitrogen blanket, dried sodium carbonate (43.24 g, 0.408 mole) was added. The temperature was raised gradually to 335° C. over 200 minutes then maintained for 1 hour.

The reaction mixture was allowed to cool, milled and washed with acetone and water. The resulting polymer, was dried in an air oven at 120° C. The polymer had a Tg of 164° C., a melt viscosity at 400° C., 1000 sec$^{-1}$ of 0.48 kNsm$^{-2}$ and an inherent viscosity (IV) 0.40 (measured at 25° C. on a solution of the polymer in concentrated sulphuric acid of density 1.84 g.cm$^{-3}$, said solution containing 0.1g of polymer/100 cm$^3$)

Examples 2 to 6.

The polymerisation procedure of Example 1 was followed, except that copolymers of different compositions were prepared by varying the mole ratios of 4,4'-dihydroxybenzophenone to 4,4',-dihydroxybiphenyl, with the sum of the number of moles of the aforesaid reactants equalling the number of moles of 4,4'-difluorobenzophenone, as described in Example 1. A summary of the mole ratios and the MV are detailed in the table below.

| Example No | 4,4' dihydroxybiphenyl:<br>4,4'-dihydroxybenzophenone | MV(kNsm$^{-2}$) |
| --- | --- | --- |
| 2 | 2:1 | 0.17 |
| 3a | 1:1 | 0.48 |
| 3b* | 1:1 | 0.69 |
| 4 | 1:2 | 0.54 |
| 5 | 1:3 | 0.43 |
| 6 | 1.25:1 | 0.34 |

*The polymerisation procedure of Example 1 was followed except dried sodium carbonate (43.24 g, 0.408 mole) was replaced by dried sodium carbonate (42.44 g, 0.4 mole) and dried potassium carbonate (1.11 g, 0.008 mole).

The polymerisation procedure of Example 1 was followed except dried sodium carbonate (43.24 g, 0.408 mole) was replaced by dried sodium carbonate (42.44 g, 0.4 mole) and dried potassium carbonate (1.11 g, 0.008 mole).

Example 7a

A 700 ml flanged flask fitted with a ground glass Quickfit lid, stirrer/stirrer guide, nitrogen inlet and outlet was charged with 4,4'-difluorobenzophenone (89.03 g, 0.408 mole), 4,4'-dihydroxybiphenyl (37.24 g, 0.2 mole) 4,4'-oxydiphenylsulphone (50.05 g, 0.2 mole), and diphenysulphone (332 g) and purged with nitrogen for over 1 hour. The contents were then heated under a nitrogen blanket to between 140 and 150° C. to form an almost colourless solution. While maintaining a nitrogen blanket, dried sodium carbonate (42.44 g, 0.4 mole) and potassuim carbonate (1.11 g, 0.008 mole) were added. The temperature was raised gradually to 315° C. over 3 hours then maintained for 0.5 hours.

The reaction mixture was allowed to cool, milled and washed with acetone and water. The resulting polymer was dried in an air oven at 120° C. The polymer had a Tg of 183° C., a melt viscosity at 400° C, 1000 sec$^{-1}$ of 0.78 kNsm$^{-2}$ and an inherent viscosity (IV) 0.40 (measured at 25° C. on a solution of the polymer in concentrated sulphuric acid of density 1.84 g.cm$^{-3}$, the solution containing 0.1 g of polymer/100cm$^3$)

Example 7b

The polymerisation procedure of Example 7a was followed except dried sodium carbonate (42.44 g, 0.4 mole) and dried potassium carbonate (1.11 g, 0.008 mole) was replaced by dried sodium carbonate only (43.24 g, 0.408 mole). The polymer had a Tg of 183° C. and a melt viscosity at 400° C., 1000 sec$^{-1}$ of 0.43 kNsm$^{-2}$

Examples 8 and 10

The polymerisation procedure of Example 7b was followed, except that copolymers were prepared by varying the mole ratios of the hydroxy-containing reactants, with the sum of the number of moles of the aforesaid equalling the number of moles of 4,4'-difluorobenzophenone. A summary of the mole ratios and the MV are detailed in the table below.

| Example No | 4,4'-dihydroxybiphenyl:4,4'-dihydroxydiphenyl-sulphone | MV(kNsm$^{-2}$) |
| --- | --- | --- |
| 8 | 1:2 | 0.67 |
| 9 | 1:3 | 0.72 |
| 10 | 1:1.5 | 0.6 |

Example 11

A 700 ml flanged flask fitted with a ground glass Quickfit lid, stirrer/stirrer guide, nitrogen inlet and outlet was charged with 4,4'-dichlorodiphenylsulphone (104.25 g, 0.36 mole), 4,4'-dihydroxydiphenylsulphone (6.75 g, 0.27 mole), 4,4'-dihydroxybiphenyl (16.74 g, 0.09 mole) and diphenysulphone (245 g) and purged with nitrogen for at least 1 hour. The contents were then heated under a nitrogen blanket to between 140 and 145° C. to form an almost colourless solution. While maintaining a nitrogen blanket potassium carbonates (50.76 g, 0.37 mole), was added. The temperature was raised to 180° C., held for 0.5 hours, raised to 205° C., held for 1 hour, raised to 225° C., held for 2 hours, raised to 265° C., held for 0.5 hours, raised to 280° C. and held for 2 hours.

The reaction mixture was allowed to cool, milled and washed with acetone/methanol (30/70) and water. The resulting polymer was dried in an air oven at 120° C.

Example 12

The polymerisation procedure of Example 11 was followed, except that the ratio of 4,4'-dihydroxybiphenyl to 4,4'-dihydroxydiphenylsulphone was 1:2. The polymer has a Tg of 198° C. and on RV of 0.52.

Example 13

Sulphonation of Polymers of Example 1 to 12

The polymers of Examples 1 to 12 were sulphonated by stirring each polymer in 98% sulphuric acid (3.84 g polymer/100 g sulphuric acid) for 21 hours at 50° C. Thereafter, the reaction solution was allowed to drip into stirred deionised water. Sulphonated polymer precipitated as free-flowing beads. Recovery was by filtration, followed by washing with deionised water until the pH was neutral and subsequent drying. In general, $^1$H nmr in DMSO—d6 confirmed that 100 mole % of the biphenyl units had sulphonated, giving one sulphonic acid group, ortho to the ether linkage, on each of the two aromatic rings comprising the biphenyl unit. For examples 3 to 5, 100% sulphonation of —O—Ph—Ph—O— moieties was confirmed by, converting the sulphonated ionomer from the H$^+$ form to Na$^+$ form, by reacting 0.5 g of the dry sulphonated copolymer with an aqueous solution of NaOH (2.5 g NaOH/200 ml water) at 60–65° C. for 2 hours then washing the product with water and drying at 60° C., followed by sodium analysis.

Example 14

Membrane Fabrication

Membranes were produced from selected polymers off Examples 1 to 12 after sulphonation as described in Example 13 by dissolving respective polymers in N-methylpyrrolidone (NMP). The polymers were dissolved at a concentration of 15% wt/v, except for Examples 3a and 6 which were dissolved to 4% wt/v. The homogeneous solutions were cast onto clean glass plates and then drawn down to give 300 micron films, using a stainless steel Gardner Knife. Evaporation at 100° C. under vacuum for 24 hours produced membranes of mean thickness 40 microns except that Examples 3a and 6 produced membranes of about 10 microns.

Example 15

Water-uptake of the Membranes 5 cm×5 cm×40 microns samples of membranes of Example 14 were immersed in deionized water (500 ml) for 3 days, dried quickly with lint-free paper to remove surface water and weighed, dried in an oven at 50° C. for 1 day, allowed to cool to ambient temperature in a desiccator then weighed quickly.

The water uptake was measured as follows, with the results being provided in the table below. "Equivalent weight" is defined as the weight of polymer containing unit weight of replaceable acidic hydrogen.

$$\% \text{ Water Up-take} = \frac{\text{Wet Weight} - \text{Dry Weight}}{\text{Dry Weight}} \times 100$$

| Membrane prepared from sulphonated polymer of Example No: | Equivalent Weight (g/mol) | % Water Up-take |
| --- | --- | --- |
| 2 | 360 | 136.4 |
| 3a | 458 | 54.4 |
| 6 | 419 | 69.3 |
| 7a | 476 | 61.5 |
| 8 | 690 | 30.5 |
| 9 | 904 | 21.9 |
| 10 | 583 | 38.7 |
| 11 | 976 | 21.6 |
| 12 | 744 | 30.7 |

Example 16

Performance of Membranes a Polymer Membrane Fuel Cell

The membranes prepared from sulphonated polymers of Examples 8 to 11 were installed in a Standard PEMFC single cell test module and polarisation date was generated and compared to Nafion 115, a leading commercially-available membrane. The current densities obtained at 0.8 V were 0.42, 0.58 and 0.26Acm$^{-2}$ for the Example 8 to 11 polymers respectively, compared to 0.12 Acm$^{-2}$ for Nafion 115.

Example 17

The S number of a polymer is defined as follows:

$$S \text{ Number} = \frac{\text{Number of unsulphonated phenyls}}{\text{Number of sulphonated phenyls}}$$

The S number for polymers described above is summarised in the table below.

| Example No. | S Number |
| --- | --- |
| 1 | 2.33 |
| 2 | 2 |
| 3 | 3 |
| 4 | 5 |
| 5 | 7 |
| 6 | 2.6 |
| 7a | 3 |
| 8 | 5 |
| 9 | 7 |
| 10 | 4 |
| 11 | 7 |
| 12 | 5 |

Example 18

A 500 ml, 3-necked round-bottomed flask fitted with a stirrer, nitrogen inlet and air condenser was charged with 4,4'-difluorobenzophenone (35.79 g, 0.164 mole), hydroquinone (11.01 g, 0.10 mole), 4,4'-dihydroxybiphenyl (18.62 g, 0.10 mole), 4,4'-bis(4-chlorophenylsulphonyl)biphenyl (LCDC) (20.13 g, 0.04 mole) and diphenylsulphone (202.76 g) and the contents were heated under a nitrogen blanket to 160° C. to form a nearly colourless solution. While maintaining a nitrogen blanket, anhydrous potassium carbonate (29.02 g, 0.21 mole) was added and the mixture stirred for 35 minutes. The temperature was raised gradually to 220° C. over 2 hours then raised to 280° C. over 2 hours and maintained for 2 hours.

The reaction mixture was allowed to cool, milled and washed with acetone/methanol and water. The resulting solid polymer was dried at 140° C. under vacuum. The polymer had a reduced viscosity of (RV) 2.50 (measured at 25° C. on a solution of the polymer in concentrated sulphuric acid of density 1.84 g.cm$^{-3}$, said solution containing 1 g of polymer/100 cm$^{-3}$) and a Tg of 186° C.

Example 19

A 250 ml, 3-necked round-bottomed flask fitted with stirrer, nitrogen inlet and air condenser was charged with 4,4'-difluorobenzophenone (33.06 g, 0.1515 mole), hydroquinone (13.21g, 0.12 mole), 9, 9'-bis (4-hydroxyphenyl)fluorene(HPF) (10.512 g, 0.03 mole); and diphenylsulphone (100.93 g) and the contents were heated under a nitrogen blanket to 150®C. to form a nearly colourless solution. While maintaining a nitrogen blanket, anhydrous potassium carbonate (21.77 g, 0.15751 mole) was added. The temperature was raised to 175° C. maintained for 2 hours, raised to 200° C. maintained for 50 minutes, raised to 250° C. maintained for 45 minutes, raised to 300° C. maintained for 90 minutes.

The reaction mixture was allowed to cool, milled and washed with acetone/methanol and water. The resulting solid polymer was dried at 140° C. under vacuum. The polymer had a reduced viscosity (RV) of 0.76 (measured at 25°, PC on a solution of the polymer in concentrated sulphuric acid of density 1.84 g.cm$^{-3}$, said solution containing 1 g of polymer/100 cm$^{-3}$) and a Tg of 165° C.

Example 20

A 250 ml, 3-necked round-bottomed flask fitted with a stirrer, nitrogen inlet and air condenser was charged with 4,4'-bis(4-chlorophenylsulphonyl)-terphenyl (23.2 g, 0.04 mole), 4,4'-dihydroxybiphenyl (7.44 g, 0.040 mole) and diphenylsulphone (80 g) and the contents were heated under a nitrogen blanket to 170° C. to form a nearly colourless solution. While maintaining a nitrogen blanket, anhydrous potassium carbonate (5.64 g, 0.408 mole) was added. The temperature was raised to 200° C. and maintained for 30 minutes, raised to 250° C. and maintained for 15 minutes, raised to 275° C. and maintained for 15 minutes, raised to 330° C. and maintained for 1 hour.

The reaction mixture was allowed to cool, milled and washed with acetone/methanol and water. The resulting solid polymer was dried at 140° C. under vacuum. The polymer had an inherent viscosity (IV) of 0.50 (measured at 25° C. on a solution of the polymer in concentrated sulphuric acid of density 1.84 g.cm$^{-3}$, said solution containing 0.1 g of polymer/100 cm$^3$) and a Tg of 264° C.

Example 21

A 250 ml, 3-necked round-bottomed flask fitted with a stirrer, nitrogen inlet and air condenser was charged with 4,4'-difluorobenzophenone (21.82 g, 0.10 mole), 4,4'-dihydroxybiphenyl (18.62 g, 0.10 mole) and diphenylsulphone (60 g) and the contents were heated under a nitrogen blanket to 180° C. to form a nearly colourless solution. While maintaining a nitrogen blanket anhydrous potassium carbonate (14.10 g, 0.102 mole) was added. The temperature was raised to 200° C. over 60 minutes, raised to 250° C. maintained for 5 mins, raised to. 325° C. maintained for 5 mins, raised to 370° C. over 90 mins, maintained for 10 mins.

The reaction mixture was allowed to cool, milled and washed with acetone/methanol and water. The resulting solid polymer was dried at 140° C. under vacuum. The polymer had an inherent viscosity (RV) of 1.28 (measured at. 25° C. on a solution of the polymer in concentrated sulphuric acid of density 1.84 g.cm$^{-3}$, said solution containing 1 g of polymer/100 cm$^3$) and a Tg 167° C.

Example 22

A 250 ml, 3-necked round-bottomed flask fitted with a stirrer, nitrogen inlet and air condenser was charged with 4,4'-difluorobenzophenone (22.04 g, 0.101 mole), 4,4'-dihydroxybiphenyl (6.52 g, 0.035 mole), hydroquinone (,7.16 g, 0.065 mole) and diphenylsulphone (60 g) and the contents were heated under a nitrogen blanket to 180° C. to form a nearly colourless solution. While maintaining a nitrogen blanket anhydrous sodium carbonate (10.60 g, 0.100 mole) and anhydrous potassium carbonate (0.28 g, 0.002 mole) were added. The temperature was raised to 200° C. held for 1 hour, raised to 250° C. held for 1 hour, raised to 300° C. held for 1 hour. The reaction mixture was allowed to cool, milled and washed with acetone/methanol and water. The resulting solid polymer was dried at 140° C. under vacuum. The polymer has an inherent viscosity (IV) 0.92 (measured at 25° C. on a solution of the polymer in concentrated sulphuric acid of density 1.84 g.cm$^{-3}$, said solution containing 0.1 g of polymer/100 cm$^3$) and a Tg 156° C.

Example 23

A 250 ml, 3-necked round-bottomed flask fitted width a stirrer, nitrogen inlet and air condenser was charged with 4,4'-bis(4-fluorobenzoyl)diphenylether (21.34 g, 0.515 mole), 4,4'-dihydroxybiphenyl (9.31 g, 0.050 mole) and diphenylsulphone (90 g) and the contents were heated under a nitrogen blanket to 160° C. to form a nearly colourless solution. While maintaining a nitrogen blanket anhydrous sodium carbonate (5.30 g, 0.050 mole) and anhydrous potassium carbonate (0.14 g, 0.001 mole) were added. The temperature was raised at 1° C./min until it reached 345° C. and held for 1 hour.

The reaction mixture was allowed to cool, milled and washed with acetone/methanol and water. The resulting solid polymer was dried at 140° C. under vacuum. The polymer had an inherent viscosity (RV) 1.48 (measured at 25° C. on a solution of the polymer in concentrated sulphuric acid of density 1.84 g.cm$^{31-3}$ said solution containing 1 g. of polymer/100 cm$^3$) and a Tg 163° C.

Example 24

General procedure for Sulphonation of Polymers of Examples 18 to 23

The polymers prepared as described in Examples 18 to 23 were sulphonated according to the following procedure.

The dried polymer was placed in a three-necked round-bottomed flask fitted with a stirrer containing 98% concentrated sulphuric acid (100 cm$^3$), heated with stirring to 60° C. and maintained at the temperature for 3 hours. The reaction product was poured into 5 litres of stirred ice/water mixture. The product precipitated out. It was then filtered-off, washed with iced-water until the pH was neutral, washed with methanol and dried under vacuum at 100° C. The degree of sulphonation was determined by elemental analysis, filtration or Nmr.

Example 25

Sulphonation of Polymer of Example 22

The dried polymer from Example 22(10 g) was placed in a three-necked round-bottomed flask fitted with a stirrer, containing 98% concentrated sulphuric acid (100 cm$^3$), heated with stirring to 60° C. and maintained at that temperature for 3 hours. The reaction products was poured into 5 litres of stirred ice/water mixture. The product precipitated out, was filtered-off, washed with iced-water until the pH was neutral, washed with methanol and dried under vacuum at 100° C. Nmr analysis showed the polymer had readily sulphonated, in which 95–100 moles of the ether-diphenyl-ether and ether-phenyl-ether units had been sulphonated.

Example 26

A 500 ml 3-necked round bottomed quickfit flask fitted with stirrer/stirrer guide, nitrogen inlet and outlet was is charged with 4,4'-difluorobenzophenone (22.04 g, 0.102 mole), 4,4'-dihydroxybenzophenone (10.71 g, 0.05 mole), 2,7-dihydroxynaphthalene (8.01, 0.05 mole) and diphenyl sulphone (76.9 g) and purged with nitrogen for at least 1 hour. The contents were heated under a nitrogen blanket to about 132° C. to form a clear solution. While maintaining a nitrogen blanket, dried sodium carbonate (10.81 g, 0.102 mole) was added. The temperature was raised gradually to 290° C. over 240 minutes then maintained for 65 minutes.

The reaction mixture was allowed to cool, milled and washed with acetone and water. The resulting polymer had a Tg of 158° C. and melt viscosity at 400° C., 1000 sec$^{-1}$ of 0.5 kNsm$^{-2}$.

The polymer was sulphonated using the process described in Example 13. The resultant sulphonated polymer has a water-uptake of 69.3% and an equivalent weight of 445.

The reader's attention is directed to all papers and documents which are filed concurrently with or previous to this specification in connection with this application and which are open to public inspection with this specification, and the contents of all such papers and documents are incorporated herein by reference.

All of the features disclosed in this specification (including any accompanying claims, abstract and drawings), and/or all of the steps of any method or process so disclosed, may be combined in any combination, except combinations where at least some of such features and/or steps are mutually exclusive.

Each feature disclosed in this specification (including any accompanying claims, abstract and drawings), may be replaced by alternative features serving the same, equivalent or similar purpose, unless expressly stated otherwise. Thus, unless expressly stated otherwise, each feature disclosed is one example only of a generic series of equivalent or similar features.

The invention is not restricted to the details of the foregoing embodiment(s). The invention extends to any novel one, or any novel combination, of the features disclosed in this specification (including any accompanying claims, abstract and drawings), or to any novel one, or any novel combination, of the steps of any method or process so disclosed.

What is claimed is:

1. A device selected from a fuel cell incorporating a polymer electrolyte membrane, an electrolyser incorporating a polymer electrolyte membrane and a gas diffusion electrode, wherein said polymer electrolyte membrane or said gas diffusion electrode includes a polymer having a moiety of formula

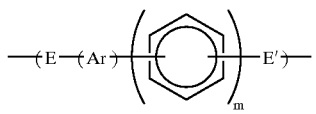

I and/or a moiety of formula

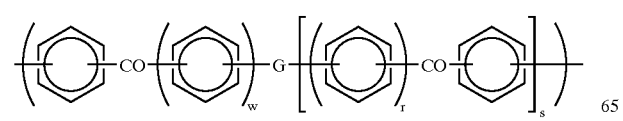

II and/or a moiety of formula

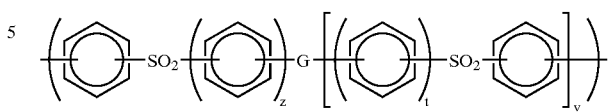

III wherein at least some of the units I, II, and/or III are sulphonated; wherein the phenyl moieties in units I, II and III are independently optionally substituted and optionally cross-linked; and wherein m,r,s,t,v,w and z independently represent zero or a positive integer, E and E' independently represent an oxygen or a sulphur atom or a direct link, G represents an oxygen or a sulphur atom, a direct link or a —O—Ph—O— moiety where Ph represents a phenyl group and Ar is selected from one of the following moieties (i) to (x) which is bonded via one or more of its phenyl moieties to adjacent moieties, wherein said polymer includes at least some ketone moieties in the polymeric chain and wherein said polymer includes a multi-phenylene moiety bonded to two oxygen atoms or a fused ring aromatic moiety bonded to two oxygen atoms:

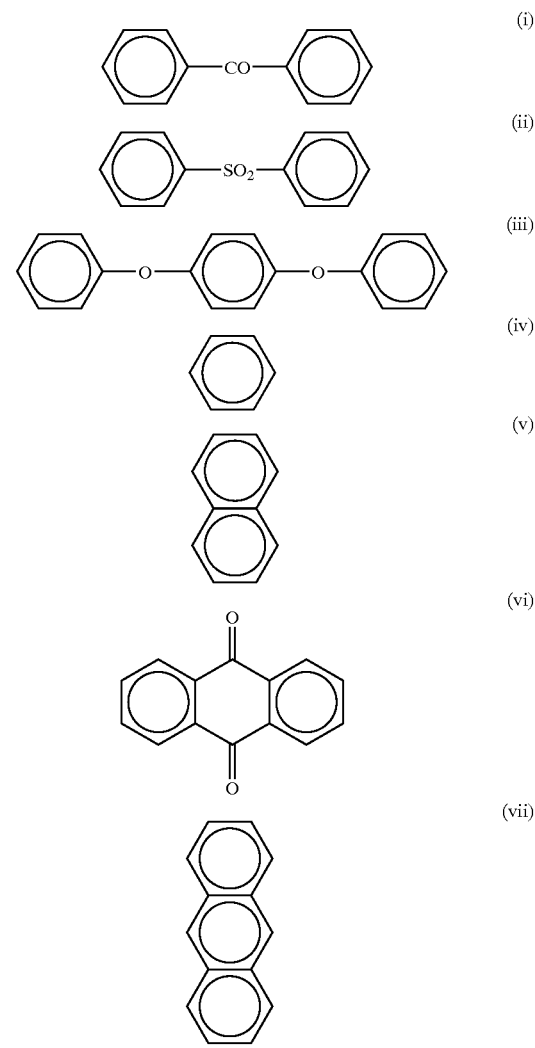

(viii)

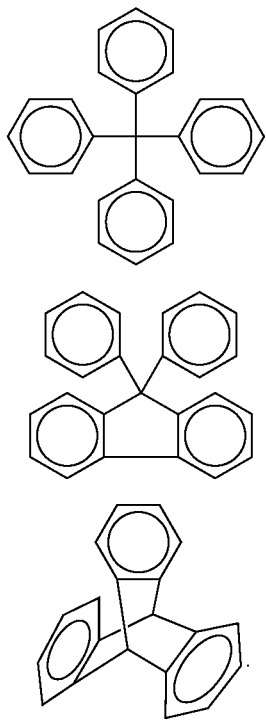

(ix)

(x)

2. A device selected from a fuel cell incorporating a polymer electrolyte membrane, an electrolyser incorporating a polymer electrolyte membrane and a gas diffusion electrode, wherein said polymer electrolyte membrane or said gas diffusion electrode includes a polymer having a moiety of formula

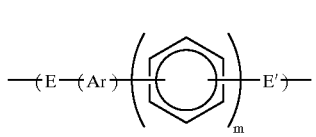

I and/or a moiety of formula

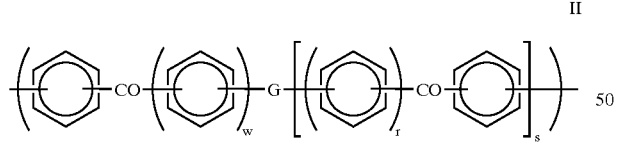

II and/or a moiety of formula

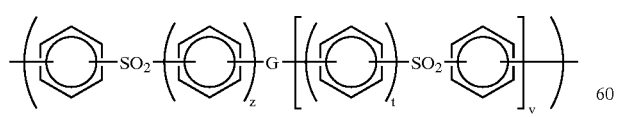

III wherein at least some of the units I, II, and/or III are functionalised to provide ion exchange sites; wherein the phenyl moieties in units I, II and III are independently optionally substituted and optionally cross-linked; and wherein m,r,s,t,v,w and z independently represent zero or a positive integer, E and E' independently represent an oxygen or a sulphur atom or a direct link, G represents an oxygen or a sulphur atom, a direct link or a —O—Ph—O— moiety where Ph represents a phenyl group and Ar is selected from one of the following moieties (i) to (x) which is bonded via one or more of its phenyl moieties to adjacent moieties, wherein said polymer includes at least some ketone moieties in the polymeric chain and wherein said polymer includes a multi-phenylene moiety bonded to two oxygen atoms or a fused ring aromatic moiety bonded to two oxygen atoms:

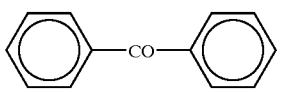

(i)

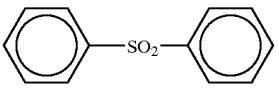

(ii)

(iii)

(iv)

(v)

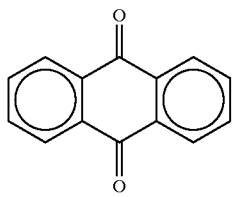

(vi)

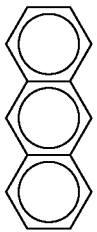

(vii)

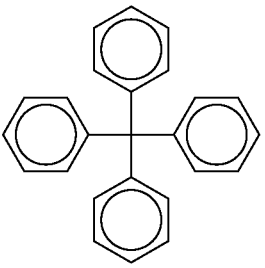

(viii)

-continued

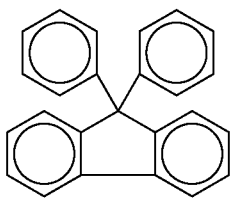
(ix)

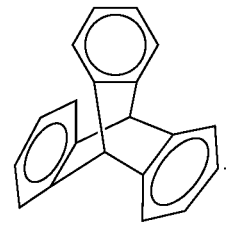
(x)

3. A device selected from a fuel cell incorporating a polymer electrolyte membrane, an electrolyser incorporating a polymer electrolyte membrane and a gas diffusion electrode, wherein said polymer electrolyte membrane or said gas diffusion electrode includes a polymer having a moiety of formula

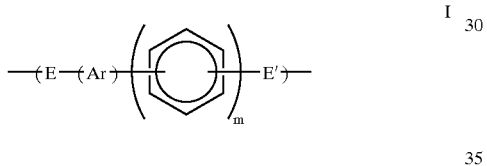
I and/or a moiety of formula

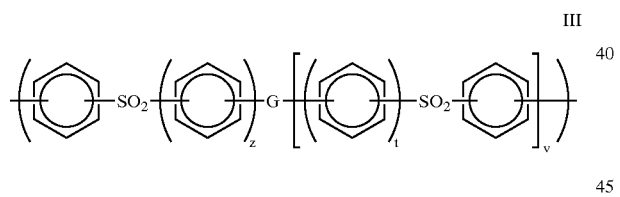
III and/or a moiety of formula

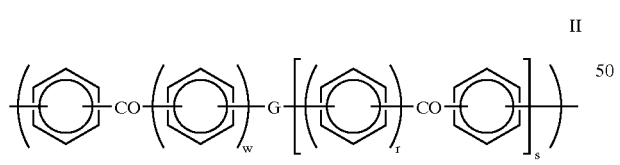
II wherein at least some of the units I, II, and/or III are functionalised to provide ion exchange sites; wherein the phenyl moieties in units I, II and III are independently optionally substituted and optionally cross-linked; and wherein m,r,s,t,v,w and z independently represent zero or a positive integer, E and E' independently represent an oxygen or a sulphur atom or a direct link, G represents an oxygen or a sulphur atom, a direct link or a —O—Ph—O— moiety where Ph represents a phenyl group and Ar is selected from one of the following moieties (i) to (x) which is bonded via one or more of its phenyl moieties to adjacent moieties, wherein said polymer is crystalline:

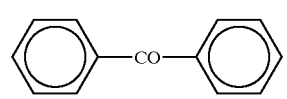
(i)

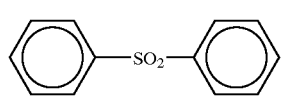
(ii)

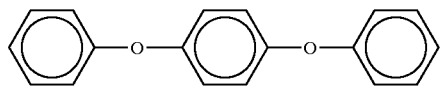
(iii)

(iv)

(v)

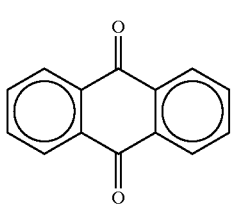
(vi)

(vii)

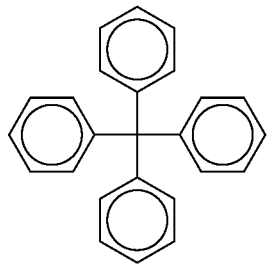
(viii)

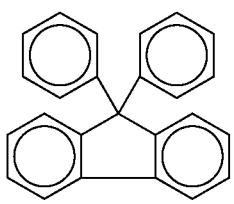
(ix)

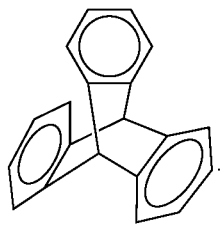

(x)

4. A device according to claim 1, wherein "a" represents the mole % of units of formula I in said polymer; "b" represents the mole % of units of formula II in said polymer; and "c" represents the mole % of units of formula III in said polymer and wherein a is in the range 45–55 and the sum of b and c is in the range of 45–55.

5. A device according to claim 1, wherein said polymer consists essentially of moieties I, II and/or III.

6. A device according to claim 1, wherein said polymer is a random or block copolymer having a first repeat unit of general formula

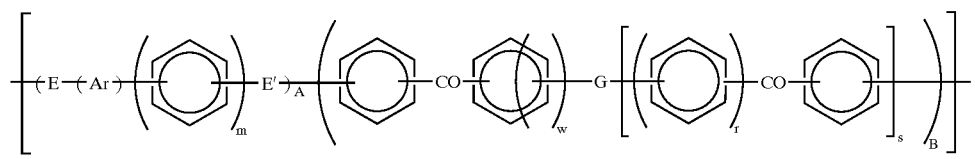

or of general formula

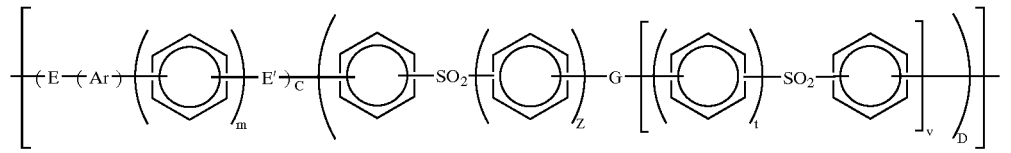

and a second repeat unit of general formula IV or V, wherein A, B, C and D independently represent 0 or 1.

7. A device according to claim 6, wherein said polymer includes at least one repeat unit of formula IV.

8. A device according to claim 6, wherein said polymer is a copolymer comprising a first repeat unit of formula IV wherein E and E' represent oxygen atoms, G represents a direct link, Ar represents a moiety of structure (iv), m represents 1, w represents 1, s represents zero, A and B represent 1; and
   a second repeat unit of formula V wherein E and E' represent oxygen atoms, Ar represents a structure (i), m represents 0, C represents 1, z represents 1, G represents a direct link, v represents 0 and D represents 1.

9. A device according to claim 6, wherein said polymer is a copolymer comprising a first repeat unit of formula IV, wherein E and E' represent oxygen atoms, G represents a direct link, Ar represents a moiety of structure (iv), m represents 1, w represents 1, s represents 0, A and B represent 1.

10. A device according to claim 6, wherein said polymer is a copolymer comprising a first repeat unit of formula IV wherein E and E' represent oxygen atoms, G represents a direct link, Ar represents a moiety of structure (iv), m represents 1, w represents 1, s represents 0, A and B represent 1; and a second repeat unit of formula IV wherein E represents an oxygen atom, E' represents a direct link, Ar represents a moiety of structure (i), m represents zero, A represents 1, B represents 0.

11. A device according to claim 6, wherein said polymer is a copolymer comprising a first repeat unit which is either:
   (a') of formula IV wherein E and E' represent oxygen atoms, G represents a direct link, Ar represents a moiety of structure (iv), m and s represent zero, w represents 1 and A and B represent 1; or
   (b') of formula IV wherein E represents an oxygen atom, E' represents a direct link, Ar represents a moiety of structure (i), m represents zero, A represents 1, B represents zero;
   and a second repeat unit which is either:
   (c') of formula IV wherein E and E' represent oxygen atoms, G represents a direct link, Ar represents a moiety of structure (iv), m represents 1, w represents 1, s represents zero, A and B represent 1; or
   (d') of formula IV wherein E represents an oxygen atom, E' is a direct link, G represents a direct link, Ar represents a moiety of structure (iv), m and s represent zero, w represents 1, A and B represent 1.

12. A device according to claim 6, wherein said polymer has a repeat unit selected from (a') of formula IV wherein E and E' represent oxygen atoms, G represents a direct link, Ar represents a moiety of structure (iv), m and s represent zero, w represents 1 and A and B represent 1; or
   (b') of formula IV wherein E represents an oxygen atom, E' represents a direct link, Ar represents a moiety of structure (i), m represents zero, A represents 1, B represents zero;
   in combination with a repeat unit of formula IV wherein E and E' represent oxygen atoms, G represents a direct link, Ar represents a moiety of structure (iv), m represents 1, w represents 1, s represents zero, A and B represent 1.

13. A device according to claim 6, comprising a first repeat unit which is selected from the following:
   (a) a unit of formula IV wherein E and E' represent oxygen atoms, G represents a direct link, Ar represents a moiety of structure (iv), m and s representizero, w represents 1 and A and B represent 1;
   (b) a unit of formula IV wherein E represents an oxygen atom, E' represents a direct link, Ar represents a moiety of structure (i), m represents zero, A represents 1, B represents zero;

(c) a unit of formula V wherein E and E' represent oxygen atoms, G represents a direct link, Ar represents a moiety of structure (iv), m and v represent zero, z represents 1 and C and D represent 1;

(d) a unit of formula V wherein E represents an oxygen atom, E', represents a direct link, Ar represents a moiety of structure (ii), m represents 0, C represents 1, D represents 0; or (e) a unit of formula V wherein E and E represents an oxygen atom, Ar represents a structure (i), m represents 0, C represents 1, Z represents 1, G represents a direct link, v represents 0 and D represents 1;

and a second repeat unit which is selected from the following:

(f) a unit of formula IV wherein E and E' represent oxygen atoms, G represents a direct link, Ar represents a moiety of structure (iv), m represents 1, w represents 1, s represents zero, A and B represent 1;

(g) a unit of formula IV wherein E represents an oxygen atom, E' is a direct link, G represents a direct link, Ar represents a moiety of structure (iv), m and is represent zero, w represent 1, A and B represent 1;

(h) a unit of formula V wherein E and E' represent oxygen atoms G represents a direct link, Ar represents a moiety of structure (iv), m represents 1, z represents 1, v represents 0, C and D represent 1; and (i) a unit of formula V wherein E represents an oxygen atom, E' represents a direct link, G represents a direct link, Ar represents a moiety of structure (iv), m and v represent zero, z represents 1, C and D represent 1.

14. A device according to claim 6, wherein said second unit is selected from a unit of formula IV wherein E and E' represent oxygen atoms, G represents a direct link, Ar represents a moiety of structure (v), m represents 0, w represents 1, s represents 0, A and B represent 1; or a unit of formula V wherein E and E' represent oxygen atoms, G represents a direct link, Ar represents a moiety of structure (v), m represents 0, z represents 1, v represents 0, c and d represent 1.

15. A device according to claim 12, wherein said copolymer has a first repeat unit selected from units (b), (d) or (e) in combination with a second repeat unit selected from units (f) or (h).

16. A device according to claim 1, wherein said polymer is a copolymer having a first repeat unit of general formula 17. A device according to claim 16, wherein said polymer includes: a repeat unit of formula IV* wherein Ar represents a moiety of structure (v), E represents a direct link, E' represents an oxygen atom, G represents a direct link, w, s and m represent 0, A and B represent 1; and/or a repeat unit of formula V* wherein Ar represents a moiety of structure (v), E represents a direct link, E' represents an oxygen atom, G represents a direct link, z, v and m represent 0, C and D represent 1.

18. A device according to claim 17, which includes a repeat unit of formula IV* or V* and a unit selected from the following:

(a) a unit of formula IV wherein E and E' represent oxygen atoms, G represents a direct link, Ar represents a moiety of structure (iv), m and s represent zero, w represents 1 and A and B represent 1;

(b) a unit of formula IV wherein E represents an oxygen atom, E' represents a direct link, Ar represents a moiety of structure (i), m represents zero, A represents 1, B represents zero;

(c) a unit of formula V wherein E and E' represent oxygen atoms, G represents a direct link, Ar represents a moiety of structure (iv), m and v represent zero, z represents 1 and C and D represent 1;

(d) a unit of formula V wherein E represents an oxygen atom, E' represents a direct link, Ar represents a moiety of structure (ii), m represents 0, C represents 1, D represents 0;

(e) a unit of formula V wherein E and E' represents an oxygen atom, Ar represents a structure (i), m represents 0, C represents 1, Z represents 1, G represents a direct link, v represents 0 and D represents 1;

(f) a unit of formula IV wherein E and E' represent oxygen atoms, G represents a direct link, Ar represents a moiety of structure (iv), m represents 1, w represents 1, s represents zero, A and B represent 1;

(g) a unit of formula IV wherein E represents an oxygen atom, E' is a direct link, G represents a direct link, Ar represents a moiety of structure (iv), m and s represent zero, w represent 1, A and B represent 1;

(h) a unit of formula V wherein E and E' represent oxygen atoms, G represents a direct link, Ar represents a moiety of structure (iv), m represents 1, z represents 1, v represents 0, C and D represent 1; and (i) a unit of formula V wherein E represents an oxygen atom, E' represents a direct link, G represents a direct

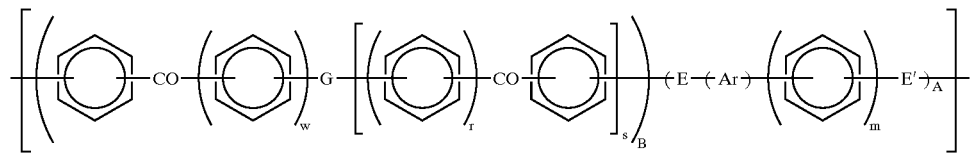

IV* or of general formula

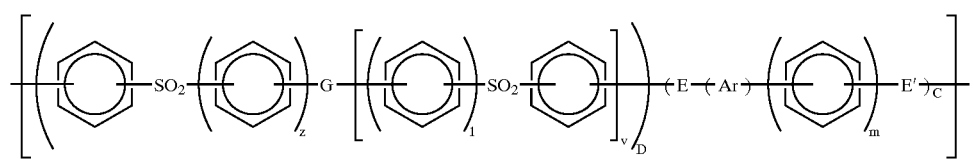

V* and a second repeat unit of general formula IV* or V*, wherein A, B. C and D independently represent 0 or 1.

link, Ar represents a moiety of structure (iv), m and v represent zero, z represents 1, C and D represent 1.

19. A device according to claim 1, wherein Ar is selected from moieties (i), (ii), (iv) and (v).

20. A device according to claim 1, wherein said polymer includes a —O-biphenylene-O— moiety or a —O-naphthalene-O— moiety.

21. A device according to claim 3, wherein said polymer includes at least some ketone moieties.

22. A device according to claim 3, wherein said polymer is a random or block copolymer having a first repeat unit of general formula

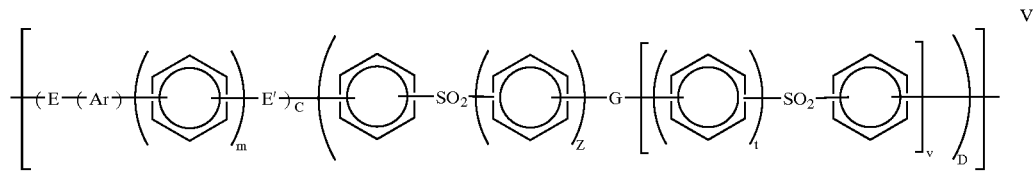

IV or of general formula

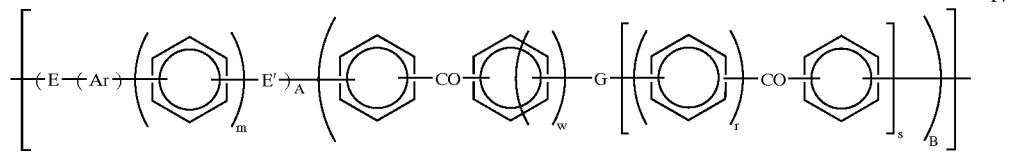

V and a second repeat unit of general formula IV or V, wherein A, B, C and D independently represent 0 or 1.

23. A device according to claim 1, wherein said polymer has a glass transition temperature (Tg) of at least 144° C.

24. A device according to claim 1, wherein said glass transition temperature is at least 154° C.

25. A device according to claim 1, wherein said polymer has an inherent viscosity of at least 0.3.

26. A device according to claim 1, wherein said device is a fuel cell.

27. A device selected from a fuel cell incorporating a polymer electrolyte membrane, an electrolyser incorporating a polymer electrolyte membrane and a gas diffusion electrode, wherein said polymer electrolyte membrane or said gas diffusion electrode includes a polymer which includes at least some ketone moieties in the polymeric chain and includes a multi-phenylene moiety bonded to two oxygen atoms or a fused ring aromatic moiety bonded to two oxygen atoms, said polymer being made in a process comprising:

(a) polycondensing a compound of general formula

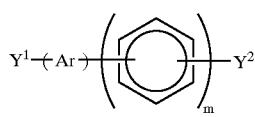

VI with itself wherein $Y^1$ represents a halogen atom or a group —EH and $Y^2$ represents a halogen atom or, if $Y^1$ represents a halogen atom, $Y^2$ represents a group E'H; or (b) polycondensing a compound of general formula

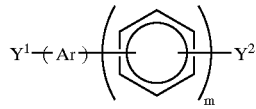

VI with a compound of formula

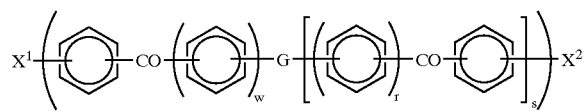

VII and or with a compound of formula

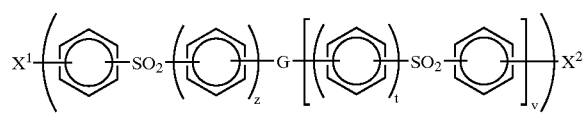

VIII wherein Y' represents a halogen atom or a group —EH (or —E'H if appropriate) and $Y^2$ represents a halogen atom or a group —E'H and $X^2$ represents the other one of a halogen atom or a group —E'H (or EH of appropriate); and (c) optionally copolymerizing a product of a process as described in paragraph (a) with a product of a process as described in paragraph (b);

wherein the phenyl moieties of units VI, VII and/or VIII are optionally substituted; the compounds VI, VII and/or VIII are optionally sulphonated; and Ar, m, w, r, s, z, t, v, G, E and E' are as described in claim 1, except that E and E' do not represent a direct link; the process also optionally comprising sulphonating and/or crosslinking a product of the reaction described in paragraphs (a), (b) and/or (c)(to prepare said polymer.

28. A process according to claim 27, wherein sulphonation is carried out in concentrated sulphuric acid at an elevated temperature.

29. A process according to claim 28, wherein said concentrated sulphuric acid comprises less than 98.5% w/w of said sulphuric acid.

30. A copolymer having a first unit of general formula

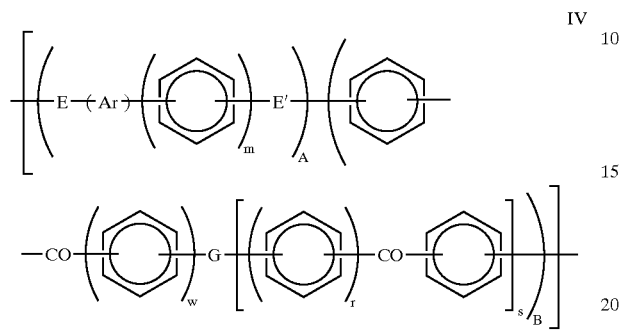

IV or of general formula

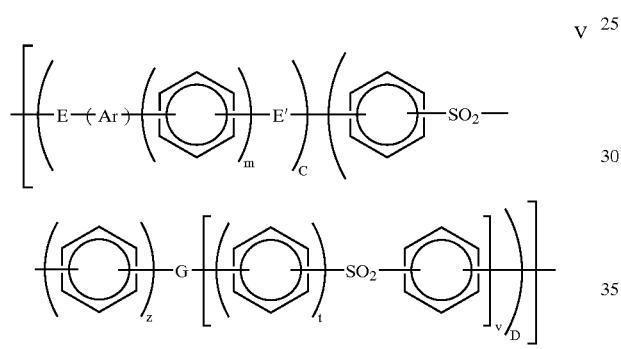

V and a second unit of general formula IV or V, wherein A, B, C and D independently represent 0 or 1;

wherein at least some of units IV and V are functionalised to provide ion-exchange sites; wherein phenyl moieties in IV and V are independently optionally-substituted and optionally cross-linked; wherein m, r, s, t, v w and z independently represent zero or a positive integer, E and E' independently represent an oxygen or a sulphur atom or a direct link, G represents an oxygen or a sulphur atom, a direct link or a —O—Ph—O— moiety wherein Ph represents a phenyl groups and Ar is selected from one of the following moieties (i) to (x) which is bonded via one or more of its phenyl moieties to adjacent moieties, wherein said copolymer includes at least some ketone moieties in the polymeric chain and wherein said polymer includes a multi-phenylene moiety bonded to two oxygen atoms or a fused ring aromatic moiety bonded to two oxygen atoms:

(i)

(ii)

-continued

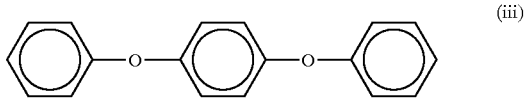

(iii)

(iv)

(v)

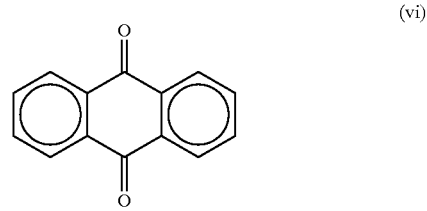

(vi)

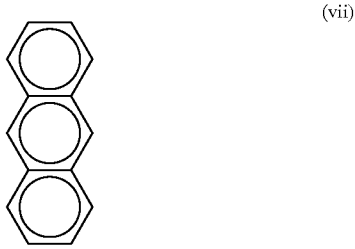

(vii)

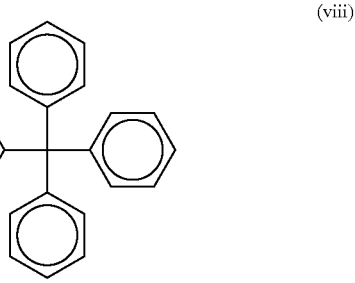

(viii)

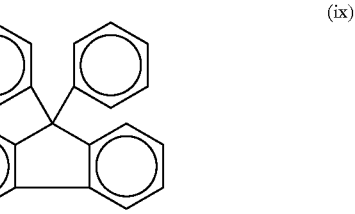

(ix)

-continued

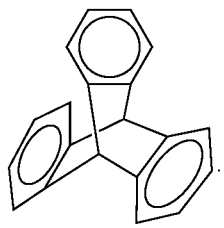
(x)

31. A copolymer according to claim 30, wherein at least its IV and V are sulphonated.

32. A copolymer according to claim 30, wherein said copolymer includes a first repeat unit of formula IV, wherein E and E' represent oxygen atoms, G represents a direct link, Ar represents a moiety of structure (iv), m represents 1, w represents 1, s represents 0, A and B represent 1.

33. A copolymer according to claim 30, wherein said copolymer includes a second unit selected from a unit of formula IV wherein E and E' represent oxygen atoms, G represents a direct link, Ar represents a moiety of structure (v), m represents 0, w represents 1, s represents 0, A and B represent 1; and a unit of formula V wherein E and E' represent oxygen atoms, G represents a direct link, Arn represents a moiety of structure (v), m represents 0, z represents 1, v represents 6, c and d represent 1.

34. A copolymer according to claim 30, wherein said copolymer includes a first repeat unit of formula IV wherein E and E' represent oxygen atoms, G represents a direct link, Ar represents a moiety of structure (iv) 1 m represents 1, w represents 1, s represents zero, A and B represent 1; and a second repeat unit of formula V wherein E and E' represent oxygen atoms, Ar represents a structure (i), m represents 0, C represents 1, z represents 1, G represents a direct link, v represents 0 and D represents 1.

35. A copolymer according to claim 30, wherein said copolymer includes a first repeat unit of formula IV wherein E and E' represent oxygen atoms, G represents a direct link, Ar represents a moiety of structure (iv), m represents 1, w represents 1, s represents 0, A and B represent 1; and a second repeat unit of formula IV wherein E represents an oxygen atom, E' represents a direct link, Ar represents a moiety of structure (i), m represents zero, A represents 1, B represents 0.

36. A copolymer according to any of claims 31 to 34, wherein at least some of units IV and V are sulphonated.

37. A device according to claim 1, or claim 2, wherein said polymer is crystalline.

38. A polymer electrolyte membrane which includes a polymer having a moiety of formula:

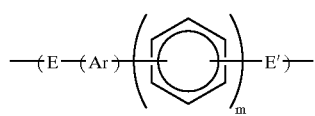
I and/or a moiety of formula

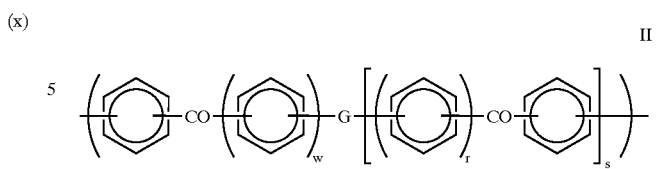
II and/or a moiety of formula

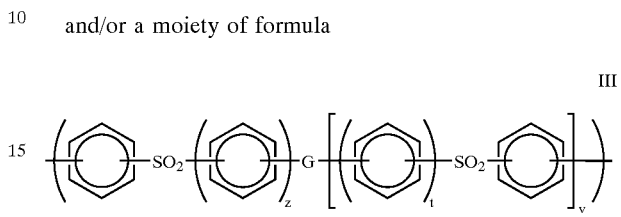
III wherein at least some of the units I, II, and/or III are sulphonated; wherein the phenyl moieties in units I, II and III are independently optionally substituted and optionally cross-linked; and wherein m,r,s,t,v,w and z independently represent zero or a positive integer, E and E' independently represent an oxygen or a sulphur atom obr a direct link, G represents an oxygen or a sulphur atom, a direct link or a —O—Ph—O— moiety where Ph represents a phenyl group and Ar is selected from one of the following i moieties (i) to (x) which is bonded via one or more of its phenyl moieties to adjacent moieties, wherein said polymer includes at least some ketone moieties in the polymeric chain and wherein said polymer includes a multi-phenylene moiety bonded to two oxygen atoms or a fused ring aromatic moiety bonded to two oxygen atoms:

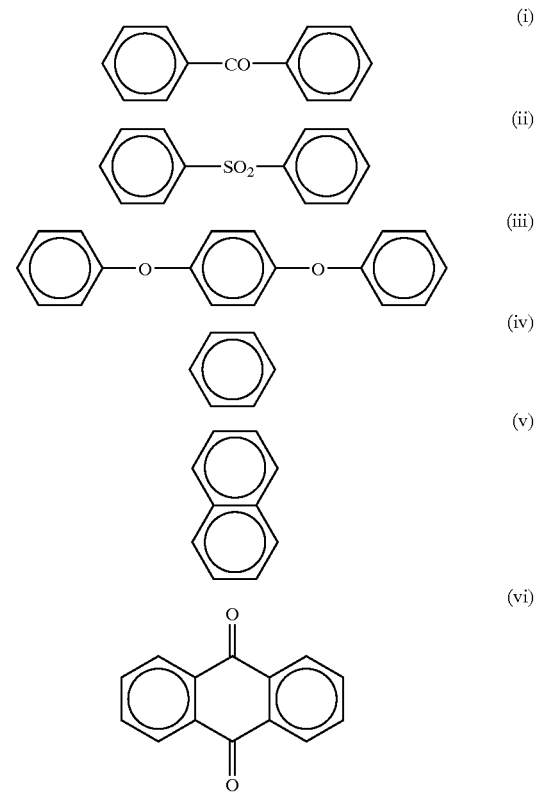

(vii)
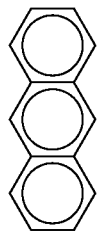
(viii)
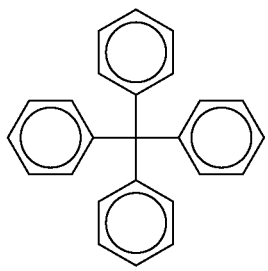
(ix)
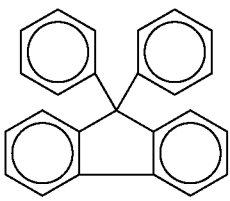
(x)
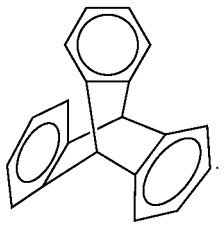
* * * * *